US007602137B2

(12) United States Patent
Du et al.

(10) Patent No.: US 7,602,137 B2
(45) Date of Patent: Oct. 13, 2009

(54) ELECTRONICALLY COMMUTATED MOTOR AND CONTROL SYSTEM

(75) Inventors: Hung T. Du, Baltimore, MD (US); Uday S. Deshpande, Baltimore, MD (US); Joshua D. West, Towson, MD (US); Bhanuprasad V. Gorti, Abingdon, MD (US); Shailesh Waikar, Cockeysville, MD (US)

(73) Assignee: Black & Decker Inc., Newark, DE (US)

( * ) Notice: Subject to any disclaimer, the term of this patent is extended or adjusted under 35 U.S.C. 154(b) by 212 days.

(21) Appl. No.: 11/676,482

(22) Filed: Feb. 19, 2007

(65) Prior Publication Data

US 2007/0210733 A1 Sep. 13, 2007

Related U.S. Application Data

(60) Provisional application No. 60/775,408, filed on Feb. 20, 2006.

(51) Int. Cl.
*H02P 1/26* (2006.01)
(52) U.S. Cl. ......................... 318/771; 318/773; 318/783
(58) Field of Classification Search ................. 318/771, 318/773, 783, 778, 776, 400.41; 388/834, 388/808
See application file for complete search history.

(56) References Cited

U.S. PATENT DOCUMENTS

| 4,710,071 A | 12/1987 | Koehler et al. |
| 5,614,799 A | 3/1997 | Anderson et al. |
| 5,875,698 A | 3/1999 | Ceroll et al. |
| 6,002,226 A | 12/1999 | Collier-Hallman et al. |
| 2001/0033742 A1* | 10/2001 | Weaver et al. ............... 388/800 |
| 2004/0189242 A1* | 9/2004 | Pyntikov et al. ............ 318/721 |

* cited by examiner

*Primary Examiner*—Karen Masih
(74) *Attorney, Agent, or Firm*—Harness, Dickey & Pierce, P.L.C.

(57) ABSTRACT

A power tool having an electronically commutated DC motor capable of providing various operating modes ranging from a maximum efficiency operating mode to a maximum power operating mode. The motor has a rotor having permanent magnets mounted in recesses in a back iron of the rotor. In one embodiment the motor has three phase windings, each having at least a pair of coils. The phase windings are connected in either a delta or a wye configuration via electromechanical or electronic switching components, or a combination of both, by a controller within the tool. The coils in each phase winding can also be switched between series and parallel configurations to configure the motor to provide its various operating modes. In one embodiment a dual wound motor is disclosed that has its phase coils dynamically or statically switchable between series and parallel configurations.

30 Claims, 30 Drawing Sheets

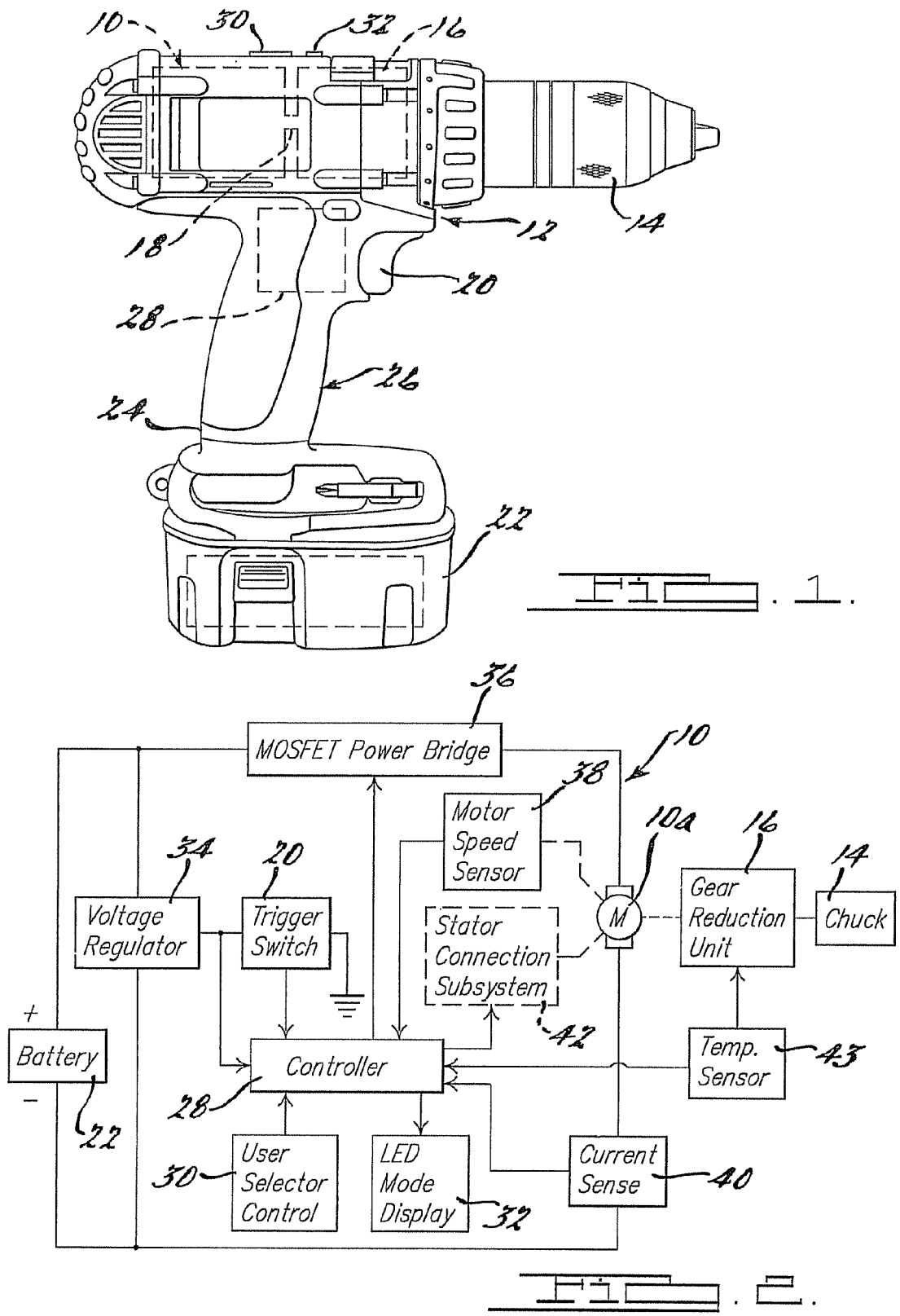

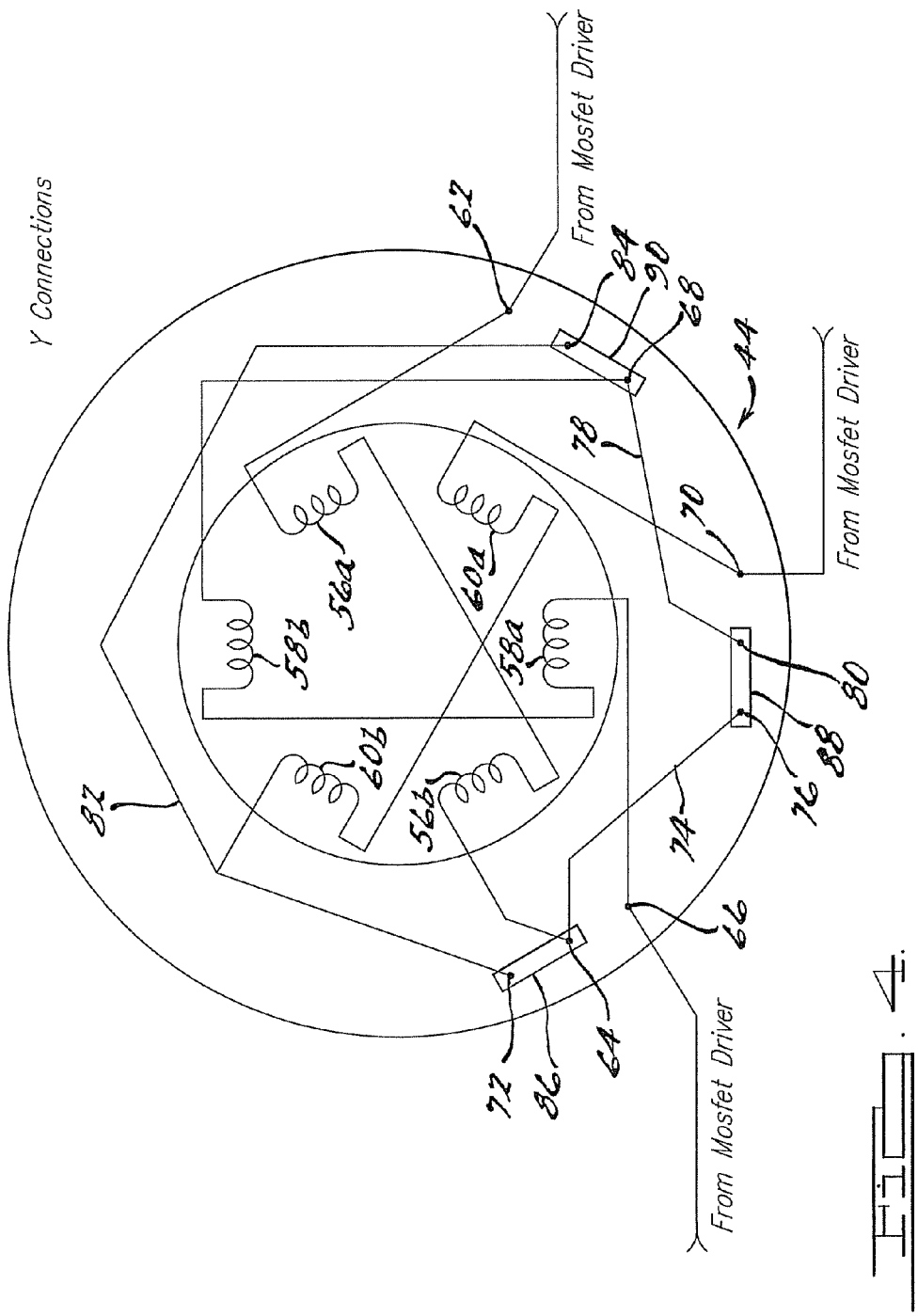

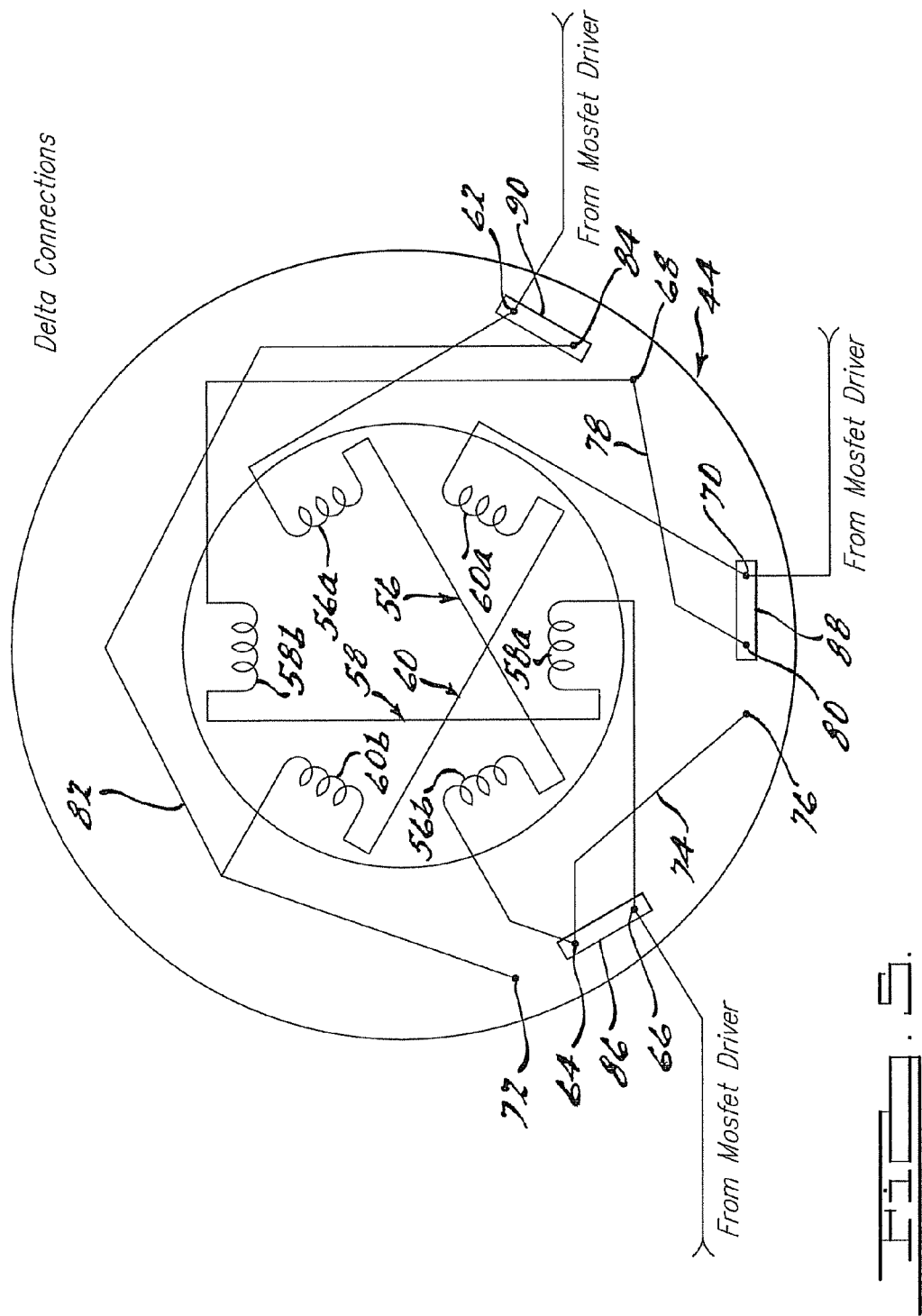

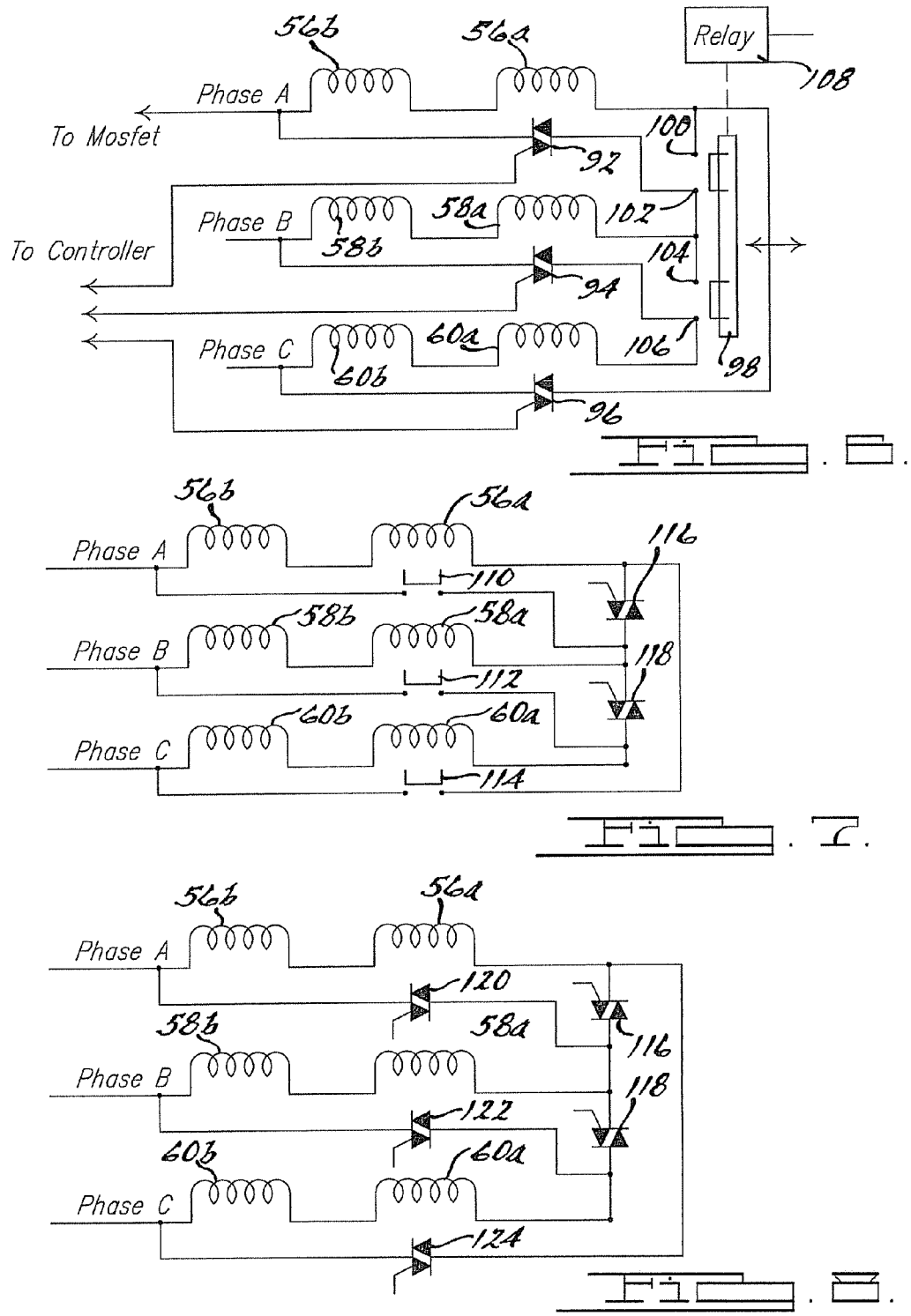

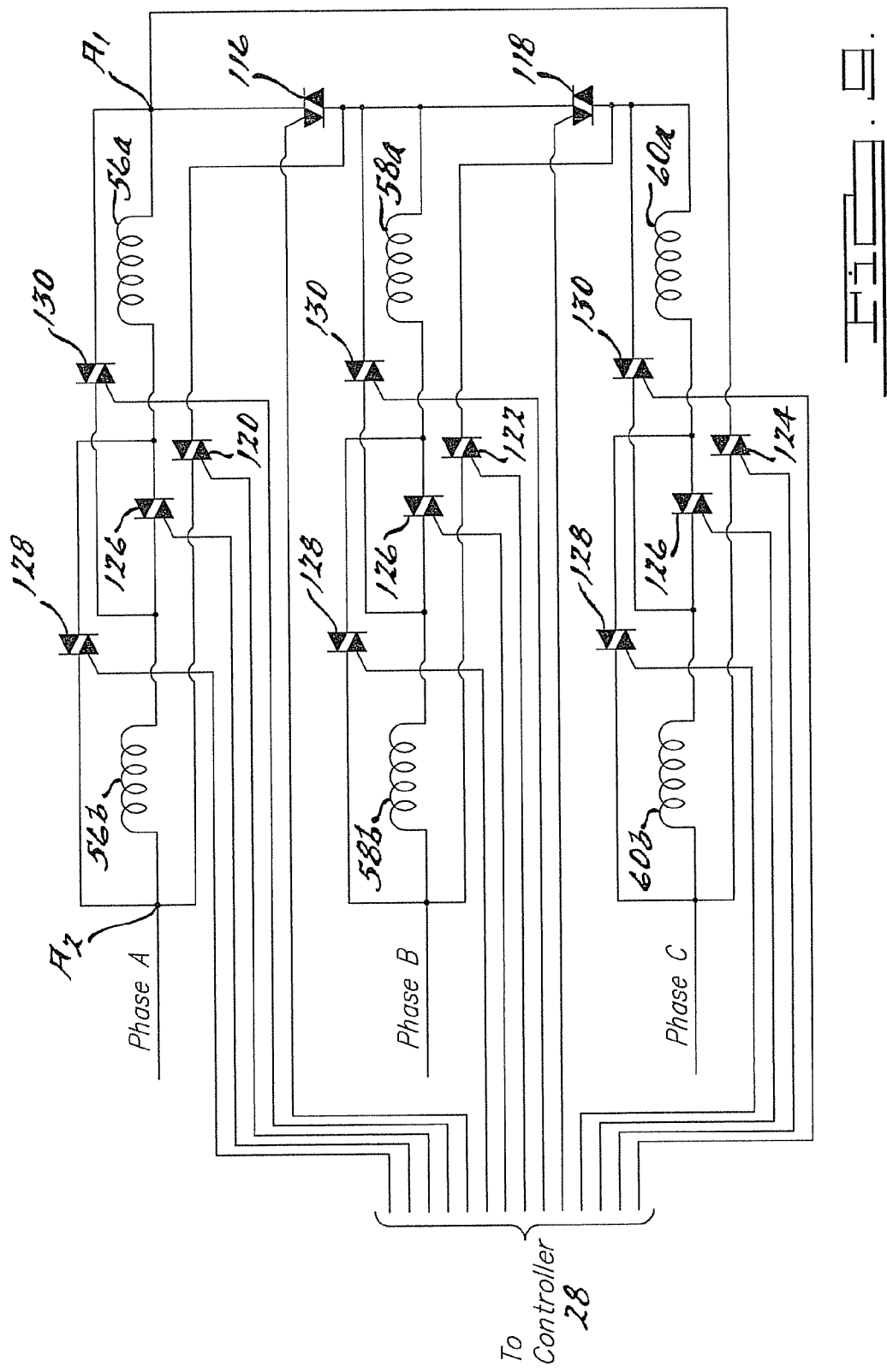

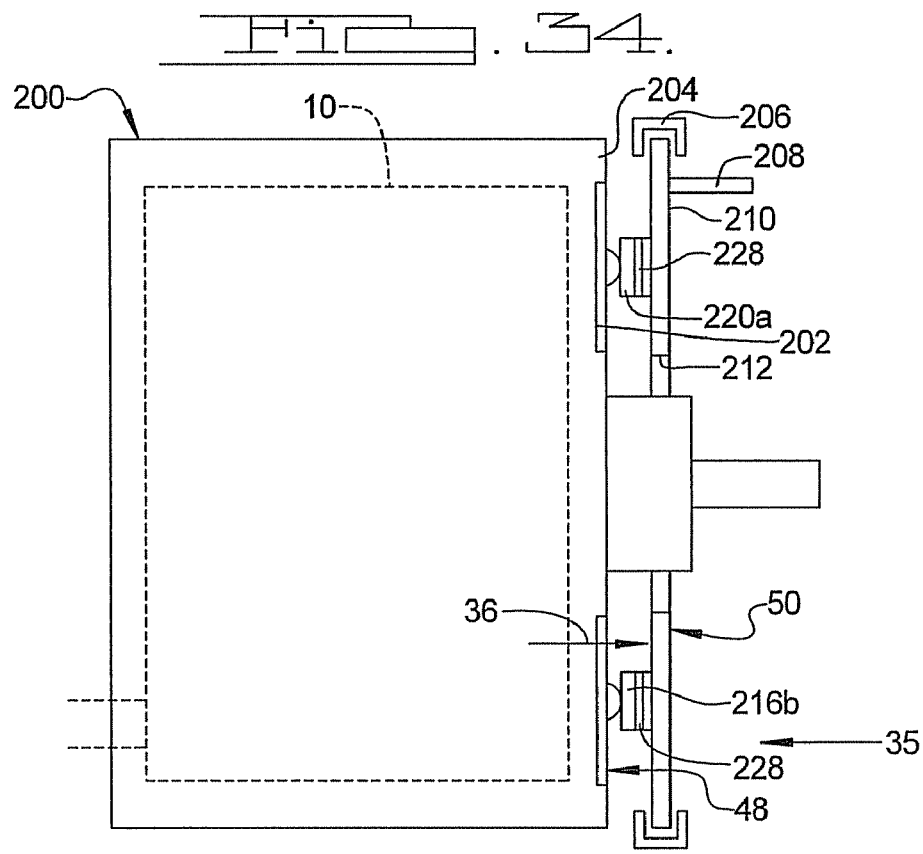
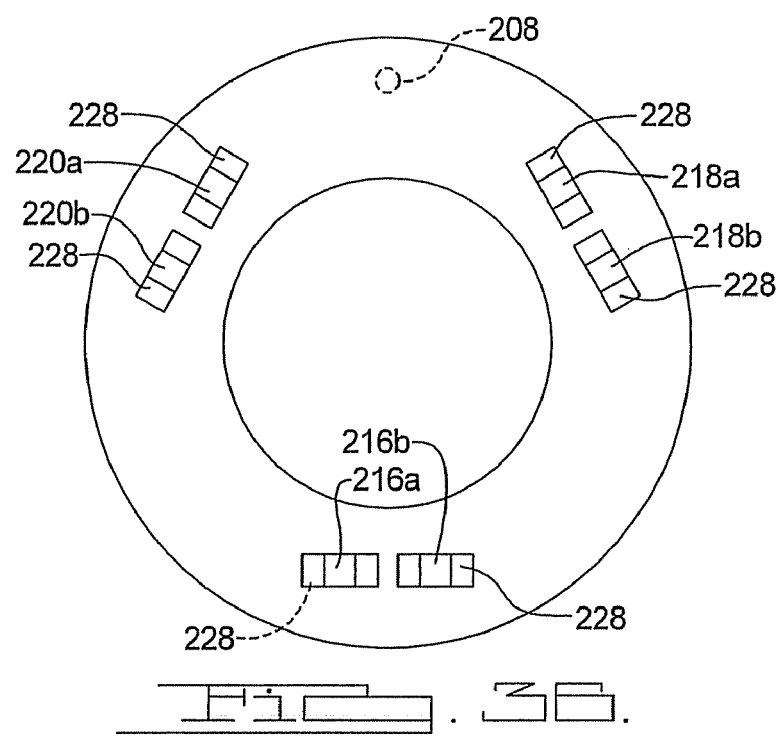

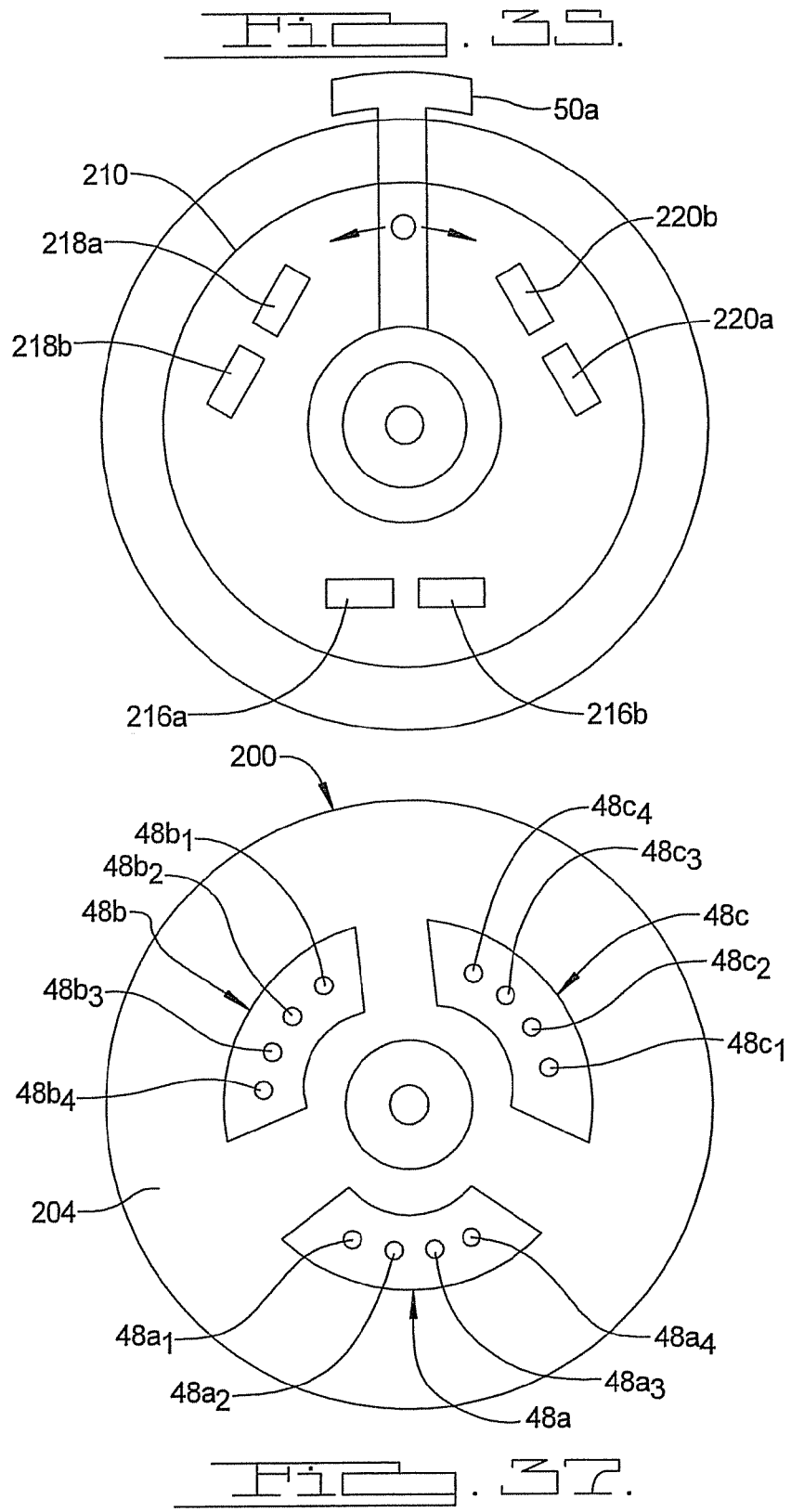

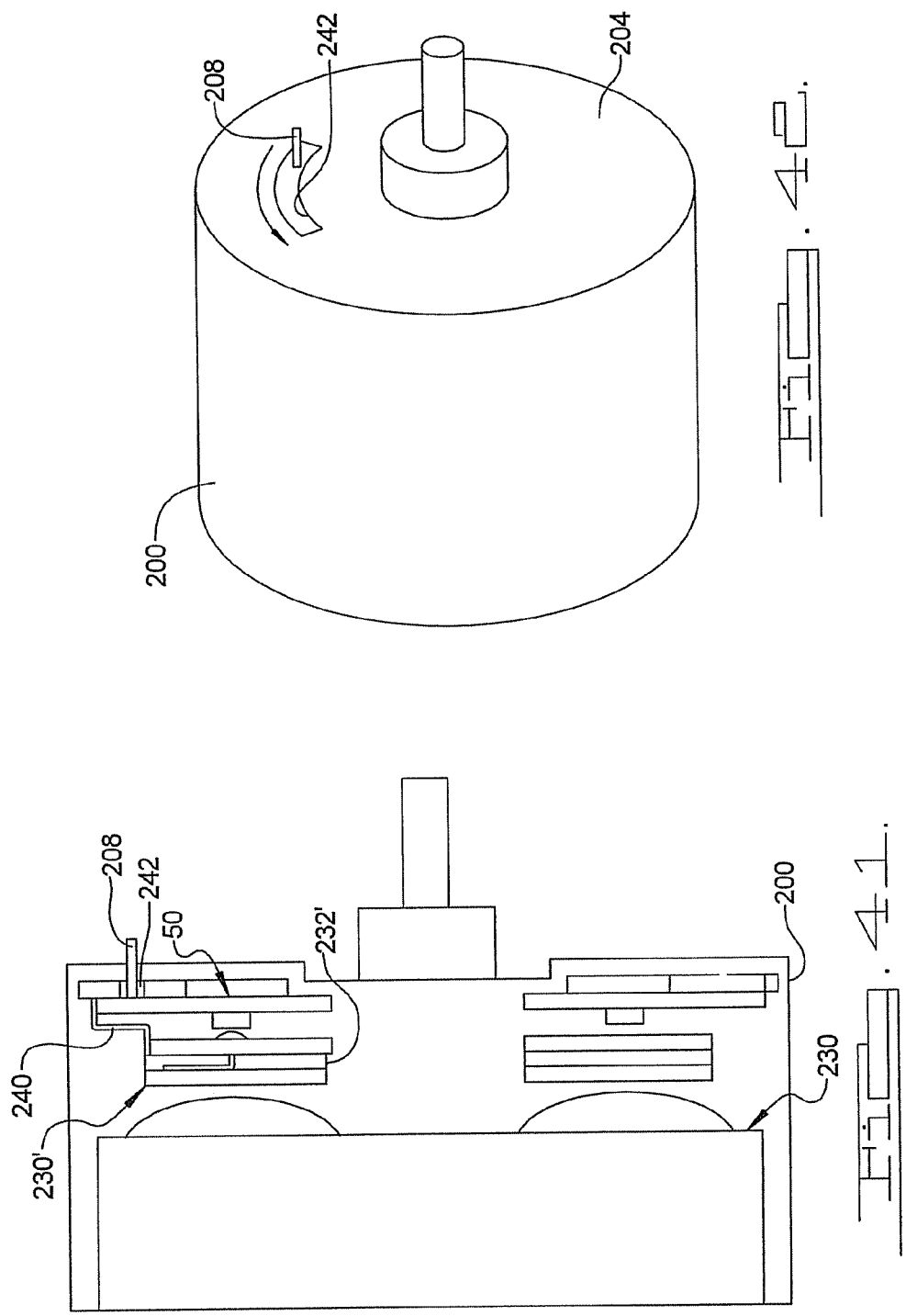

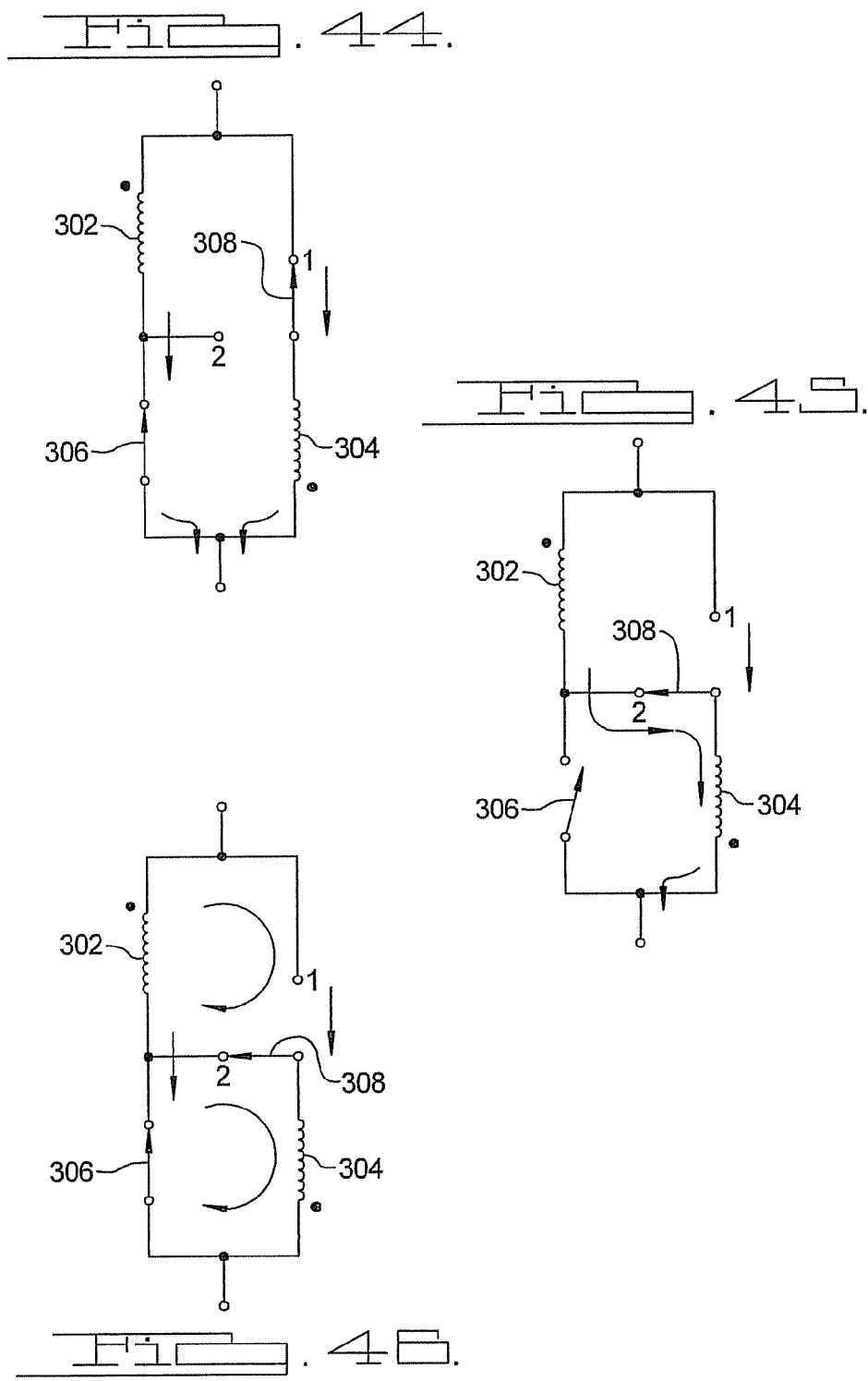

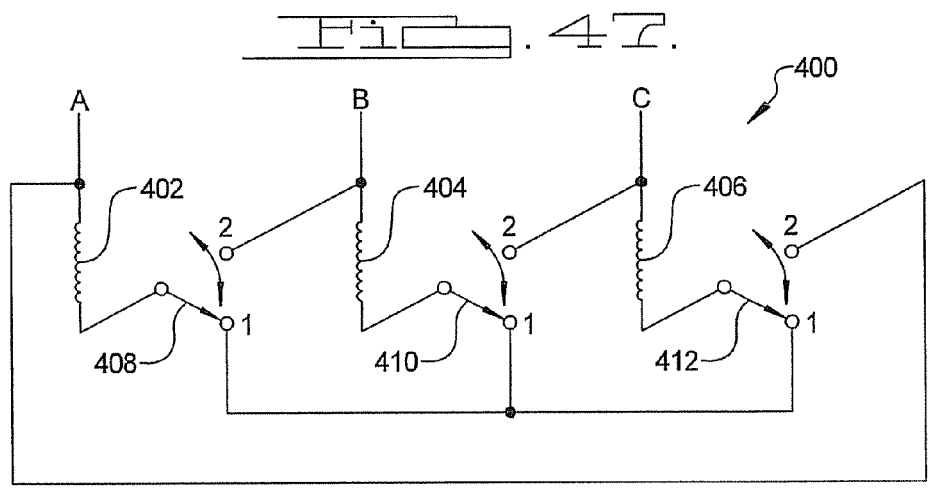
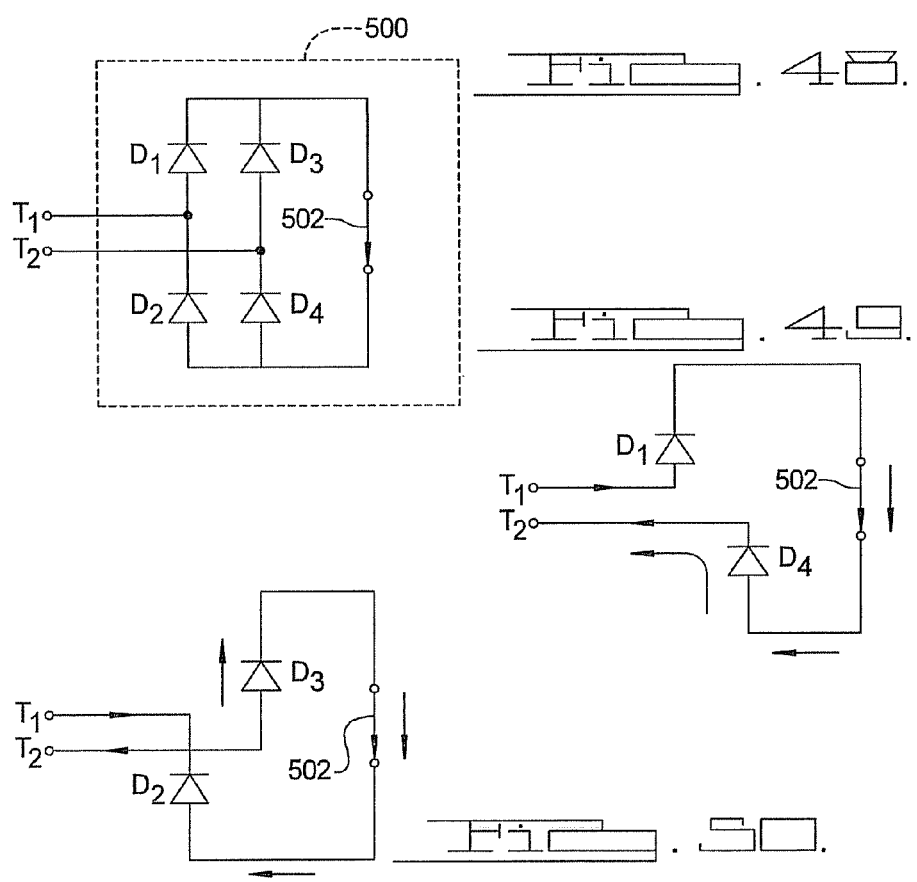

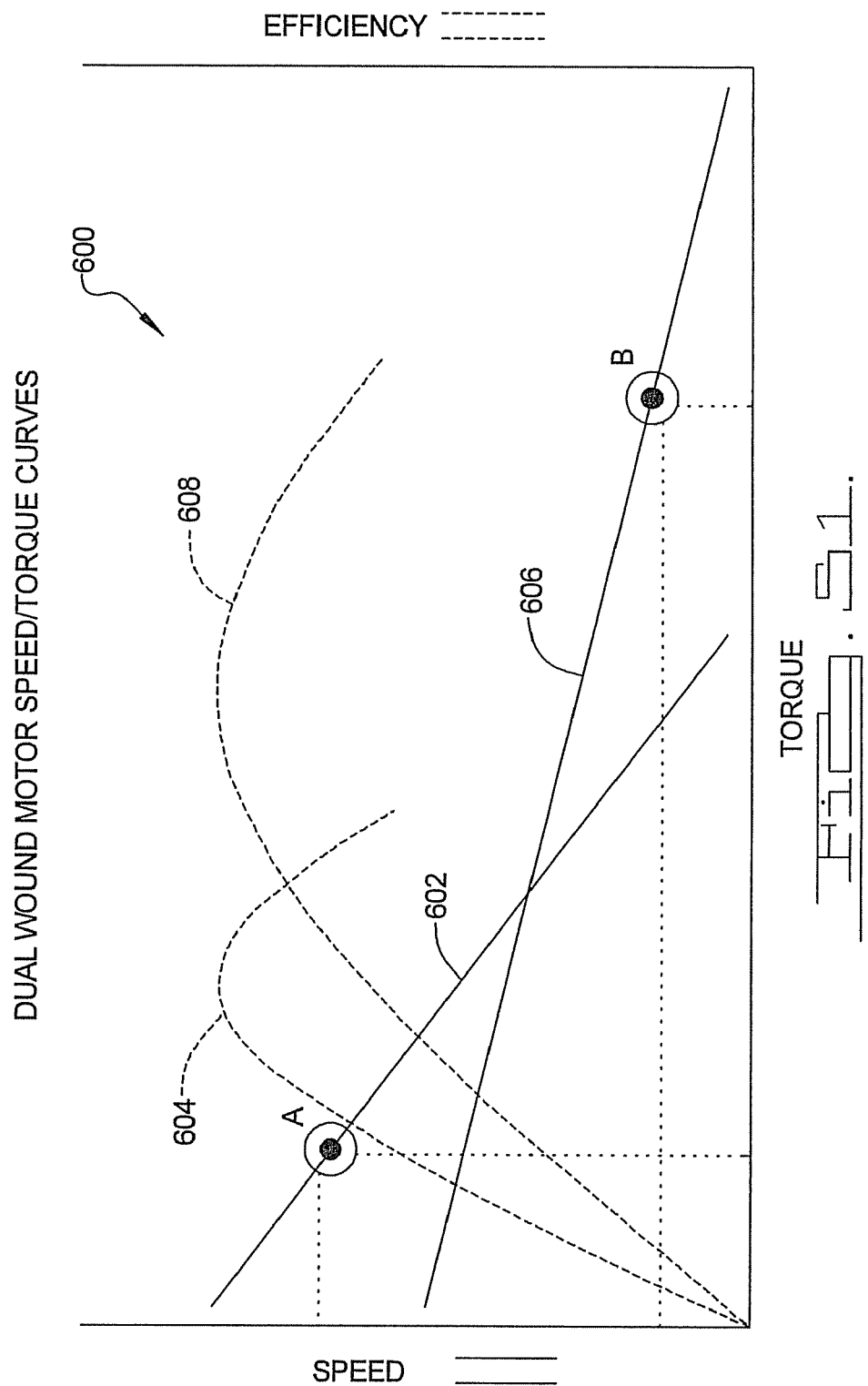

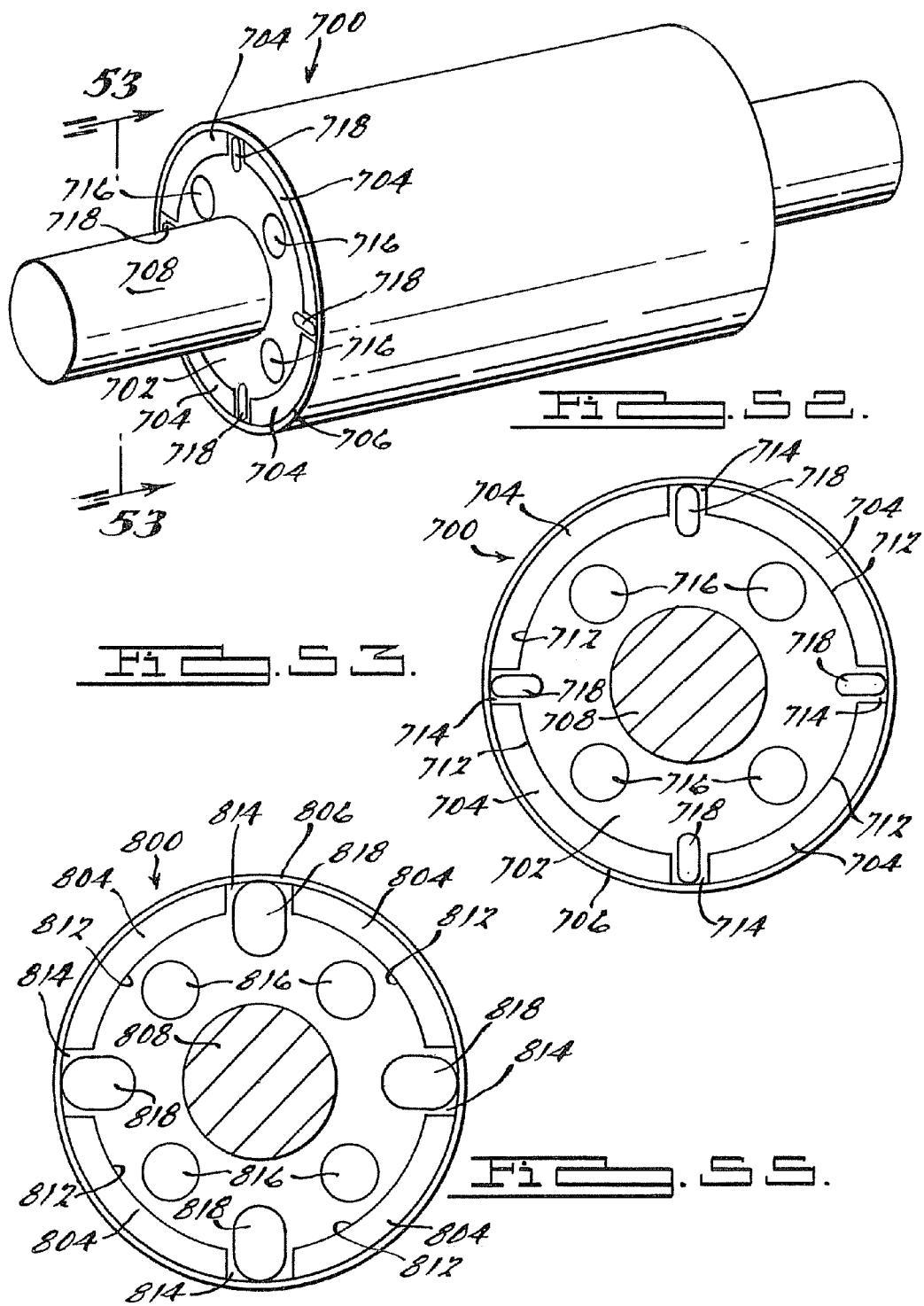

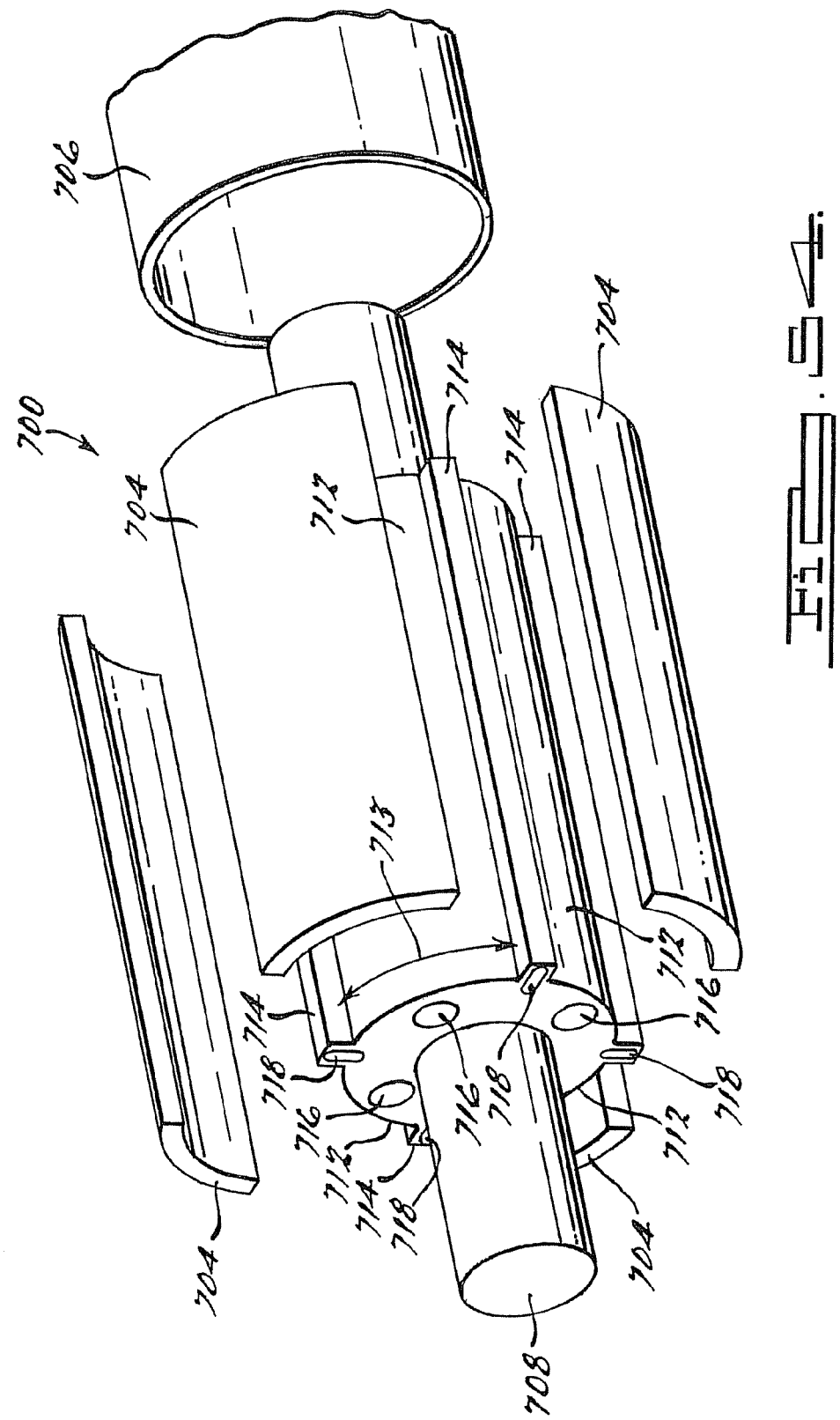

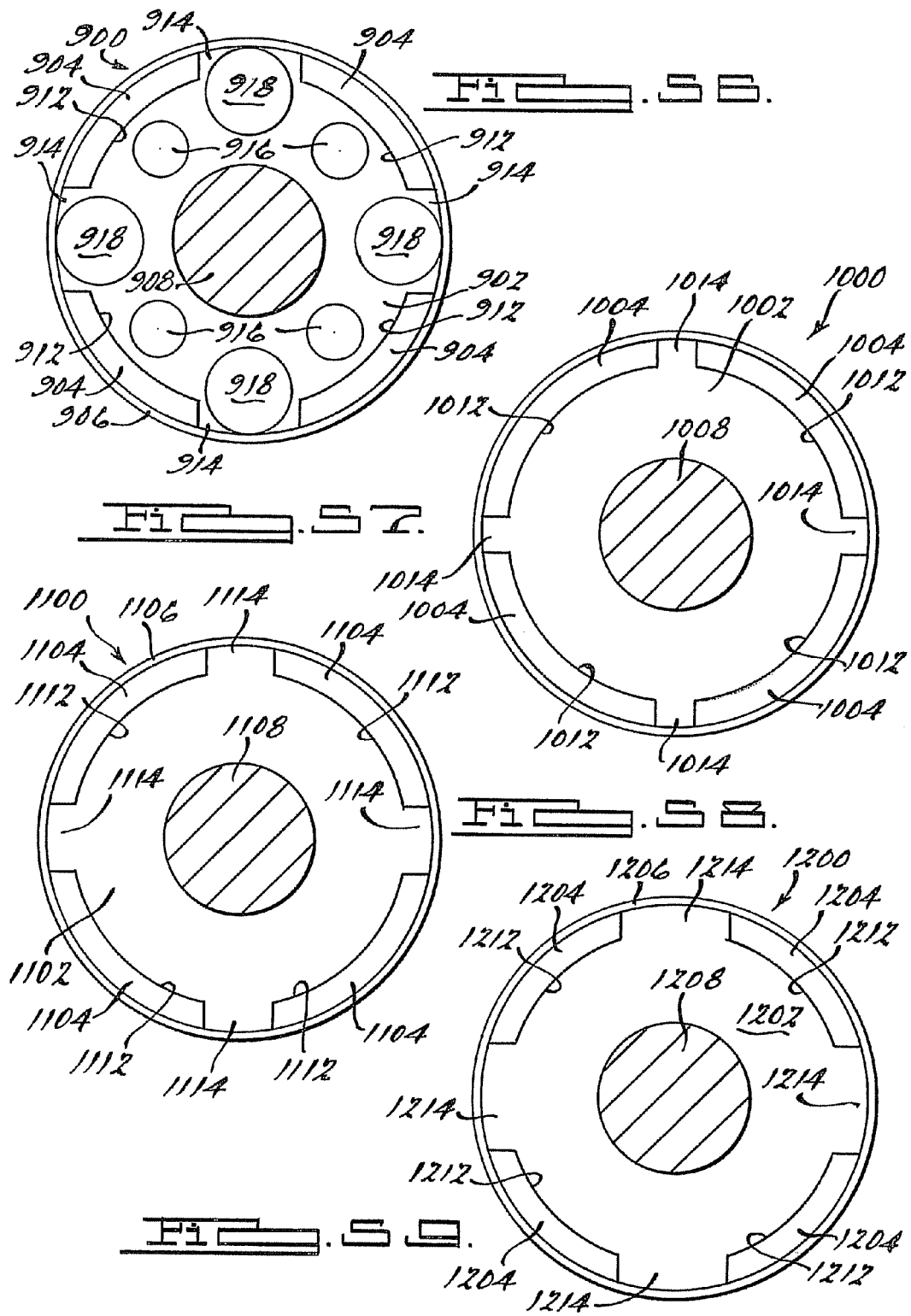

ELECTRONICALLY COMMUTATED MOTOR AND CONTROL SYSTEM

CROSS-REFERENCE TO RELATED APPLICATIONS

The present application claims priority from U.S. provisional patent application Ser. No. 60/775,408, entitled "Electronically Commutated Motor And Control System", filed Feb. 20, 2006, and is also related in general subject matter to U.S. provisional patent application Ser. No. 60/775,407, entitled "DC Motor with Dual Commutator Bar Set and Selectable Series and Parallel Connected Coils", filed Feb. 20, 2006. The disclosures of both of the above mentioned provisional applications are hereby incorporated by reference into the present application.

FIELD

The present disclosure relates to electric motors, and more particularly to an electronically commutated motor having a plurality of operating modes that provide an operator of a tool in which the motor is used with a plurality of motor performance characteristics to suit widely varying work tasks with which the power tool is used. The present disclosure also relates to a new rotor design for an electronically commutated motor.

BACKGROUND

Electronically commutated motors are used in a wide variety of applications, and particularly with power tools such as drills, saws, sanders, etc. Such motors are used with cordless power tools that are powered from a rechargeable DC battery. With cordless power tools, a wide variety of tasks often need to be performed that require different motor performance characteristics to best perform the work task. For example, when drilling a hole with a cordless drill in a soft piece of wood, the amount of torque required, and thus the power output required from the motor, may be only a small fraction of what would be needed to drill through a piece of hardwood or pressure treated lumber. However, designing the motor for high power applications is inefficient, from a power standpoint, if the same drill will frequently be used with tasks that involve only light duty drilling, where only low torque is needed for the work task. Accordingly, a motor designed to provide high power will draw additional battery current that may not be needed for many drilling tasks. This will reduce the run time of the battery powering the tool, compared to the run time that could be achieved with a motor designed for a lower maximum power output.

Accordingly, it would be beneficial to provide a motor having a plurality of distinctly different operating modes that provide varying degrees of motor speed, torque and power output, to better match the needs of specific work tasks. For example, it would be highly beneficial if a motor and associated control system was provided that could automatically sense when additional motor power is required when performing a given task, and the motor automatically switched to a specific operating mode to either increase or decrease the torque and/or operating speed of the motor. Alternatively, it would be desirable if the different operating modes of the motor could be selected by a user via a control on the power tool. This would enable the optimum operating characteristics of the motor to be employed, and changed, as needed for different work tasks. Optimizing the motor performance would also lead to the most efficient use of available battery power. This could serve to significantly extend the run time of the battery on a given charge.

Still another factor in optimizing the performance of an electronically commutated motor is the construction of the rotor used in such a motor. The typical construction of such a rotor can be broadly classified as either "surface mounted" or "interior mounted". With a surface mounted construction, the permanent magnets of the rotor are secured to the outer surface of a rotor back iron. With an interior mounted construction, the permanent magnets are typically rectangular in shape and secured in pockets or recesses formed in the rotor back iron. The surface mounted rotor construction is not as well suited for use with motors that will be operated over a wide operating range of speeds. At high operating speeds, keeping the magnets attached to the outer surface of the rotor back iron can present challenges. However, the surface mounted magnet construction can be implemented with a relatively simple electronic controller that controls energization of the windings on the stator. The surface mounted magnet construction also provides higher flux output, and thus higher power output for a given size of motor in which a rotor with surface mounted magnets is implemented.

With the internally mounted magnet construction, the problem of maintaining the magnets attached to the rotor back iron is alleviated, and the rotor is well suited for use in motors having a wide range of operating speeds. However, the internally mounted magnet construction requires a relatively complex controller to be used to compensate for the difference in the magnetic "gap" between the direct axis and the quadrature axis of each magnet. The interior mounted magnets also do not generate the same degree of flux output, for a given size motor, as surface mounted magnets, which will contribute to a lower power output for an electronically commutated motor in which the rotor is used.

As a result, it would also be desirable to provide a rotor for an electronically commutated motor that provides the performance benefits of surface mounted permanent magnet construction, without the construction drawbacks associated with this type of construction.

Still further, in power tool applications, it would be desirable if the motor could be controlled to better match its speed-torque performance curve to that of the gear system being used with the tool. With power tools such as grinders, drills, saws, etc., the gear system coupled to the output of the motor is typically made sufficiently robust so that it's speed-torque performance characteristics are a predetermined degree greater than those of the motor. This is to ensure that the speed-torque performance capability of the motor can be readily handled by the gear system without risking failure or unacceptable stress to the gear system. If the motor speed-torque performance characteristics could be closely matched to those of the gear system via electronic control over the motor, without exceeding the speed-torque performance characteristics of the gear system, then optimum use of the gear system could be made. Alternatively, this would allow a less expensive, and less robust gear system to be employed in connection with a given motor, because the speed-torque performance "headroom" normally required to be designed into the gear system would not be needed.

SUMMARY

The present disclosure relates to an electronically commutated motor and related control system that is especially well adapted for use with a wide variety of power tools, but is not necessarily restricted to applications involving power tools.

In one embodiment, the motor comprises an electronically commutated DC motor having a stator that includes a three phase winding. The three phases can be connected either in a wye or a delta configuration. Each phase is made up of at least one coil, and more preferably a plurality of coils. In alternative preferred embodiments, the coils in each phase winding can also be connected in various series and parallel configurations.

In one form, the connection of the windings in delta and wye configurations is accomplished with a movable element and contacts formed on the stator that are coupled to terminal ends of selected coils. The movable element is moved selectively such that electrical connections are made between various ones of the contacts to connect the windings in either a delta configuration or a wye configuration.

In another embodiment a controller and associated electronic switching elements are used to electronically make the needed connections to place the phase windings in a delta configuration or in a wye configuration. The controller is also used to control connecting of the coils in each winding phase between series and parallel configurations.

In another embodiment the motor includes a plurality of phase windings, with each phase winding having a plurality of phase coils. A moveable element is used to carry a plurality of conductive components. When the moveable element is in a first position relative to the motor, the phase coils of each phase winding are coupled in series. When the moveable element is moved to a second position, the phase coils in each phase winding are coupled in parallel. A control associated with the moveable element enables a user to manually select the position of the moveable member as needed to optimize the performance of the motor for a given work task. In another embodiment the switching between series and parallel configurations is carried out dynamically by a controller associated with the motor.

In still another alternative embodiment, the control system includes a user controllable selector switch that is accessible by a user. The selector switch enables the user to select one of a plurality of operating modes for the motor of the power tool. In one form the selector switch allows the user to select one of a plurality of different operating modes that provide either maximum power or maximum efficiency from the motor, or one or more intermediate modes that provide an intermediate degree of power and efficiency. The selector switch may also enable the user to select desired motor speeds. In another alternative embodiment, a controller senses the load on the motor and automatically switches between power and efficiency modes, in real time, to maximize the run time of the battery of the power tool.

In still other embodiments, the controller is used in connection with the motor to implement suitable control algorithms to achieve the voltage control and speed matching to produce desired speed/torque performance output by the motor.

In another embodiment a dual wound, brushless DC motor is disclosed. The dual wound motor makes use of a bifilar winding to provide a pair of coils in each phase of a multiphase motor. The coils may be switched between series and parallel configurations either statically, using a manual actuating control by the user, or dynamically by an electronic controller. Various arrangements are disclosed for electrically connecting the coils to enable the series and parallel configurations to be effected.

The motor of the present disclosure also makes use of a rotor having a construction that provides the benefits of surface mounted permanent magnets without the traditional performance drawbacks of a surface mounted magnet construction. The rotor includes a plurality of spaced apart pockets or recesses formed in an outer surface of a back iron of the rotor. The recesses are shaped to accommodate a plurality of arcuate shaped permanent magnets. The magnets have a thickness that permits them to rest with their outer arcuate surfaces generally flush with portions of the outer surface of the back iron. A retaining sleeve may be secured over, or formed over, the magnets and the back iron to encapsulate the magnets and hold them securely in their respective recesses in the back iron. The arcuate shaped magnets enable a uniform air gap to be maintained between the rotor and an inner surface of the stator. This provides increased flux output and greater power from a motor incorporating the rotor. This construction also provides improved robustness and excellent retention of the magnets, making the rotor well suited for use in high speed motors. The rotor can be readily implemented in a motor with a less complex controller than what would otherwise be required with a conventional rotor having interior mounted permanent magnets. This construction also allows for removal of material in the back iron where magnetic flux does not pass, which in turn allows a lighter rotor to be produced, while insuring that the majority of magnetic flux reaches the air gap and is used for producing output power.

The system of the present disclosure, in another embodiment, uses the control system to electronically control the motor to match its speed-torque performance characteristics to the speed-torque performance characteristics of a gear system coupled to an output shaft of the motor. In this manner, the motor can be controlled so that the maximum speed-torque performance characteristics of the gear system can be most efficiently utilized. This feature, conversely, would allow gear systems to be used in the present system without the need for the gear system to be designed with the typical added degree of speed-torque "headroom" that would normally be required to ensure that the speed-torque characteristics of the gear system and not exceed by those of the motor during operation of the motor. This would allow smaller and less robust gear systems to be employed for a given motor over what would be necessary without the speed-torque matching performed by the control system used with the motor Further areas of applicability of the systems and methods described herein will become apparent from the detailed description provided hereinafter. It should be understood that the detailed description and specific examples, while indicating various embodiments or methods of operation, are intended for purposes of illustration only and are not intended to limit the scope of the present disclosure.

BRIEF DESCRIPTION OF THE DRAWINGS

The present disclosure will become more fully understood from the detailed description and the accompanying drawings, wherein:

FIG. 1 is a side view of a exemplary power tool, in this example a cordless drill, with a motor in accordance with an embodiment of the present disclosure indicated in dashed lines;

FIG. 2 is simplified schematic block diagram of the internal components of the power tool of FIG. 1;

FIG. 4 is a schematic end view of the stator of the motor illustrating the phase windings coupled in a wye configuration;

FIG. 5 is a schematic end view of the stator of FIG. 4 but with the windings coupled in a delta configuration by using rotationally movable terminal blocks on the movable contact ring of FIG. 3 to selectively connect portions of the windings;

FIG. 6 is a schematic diagram illustrating how the three phase windings on the stator can be connected in either delta or wye configurations via a single movable relay contact and a plurality of thyristors;

FIG. 7 is a schematic diagram illustrating how the three phase windings on the stator can be connected in either delta or wye configurations by the use of a plurality of relay contacts and a plurality of thyristors;

FIG. 8 is a schematic diagram illustrating how the three phase windings on the stator can be switched between delta and wye configurations through the use of only thyristors;

FIG. 9 is a simplified schematic diagram of the circuit of FIG. 8, but also including additional thyristors for enabling switching of each pair of coils in each phase winding between series and parallel connections;

Figure 33:
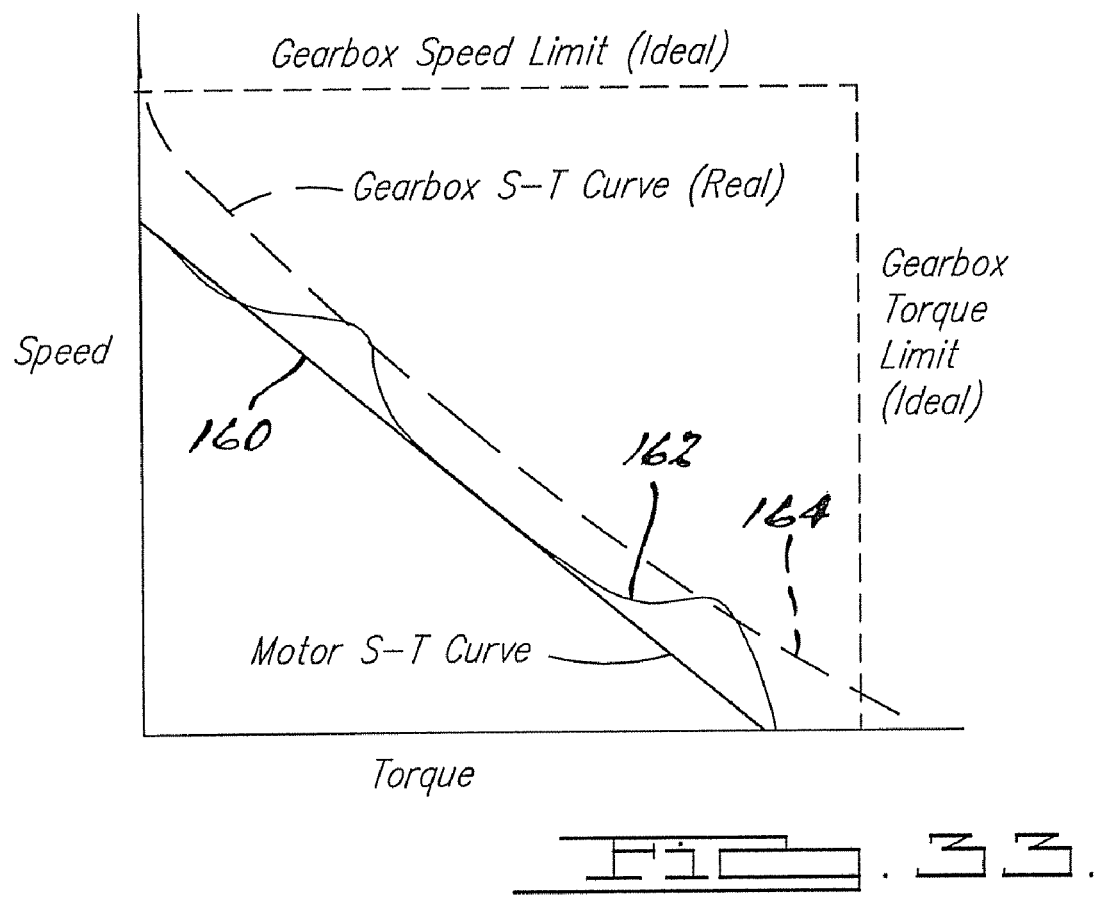
Figure 30:
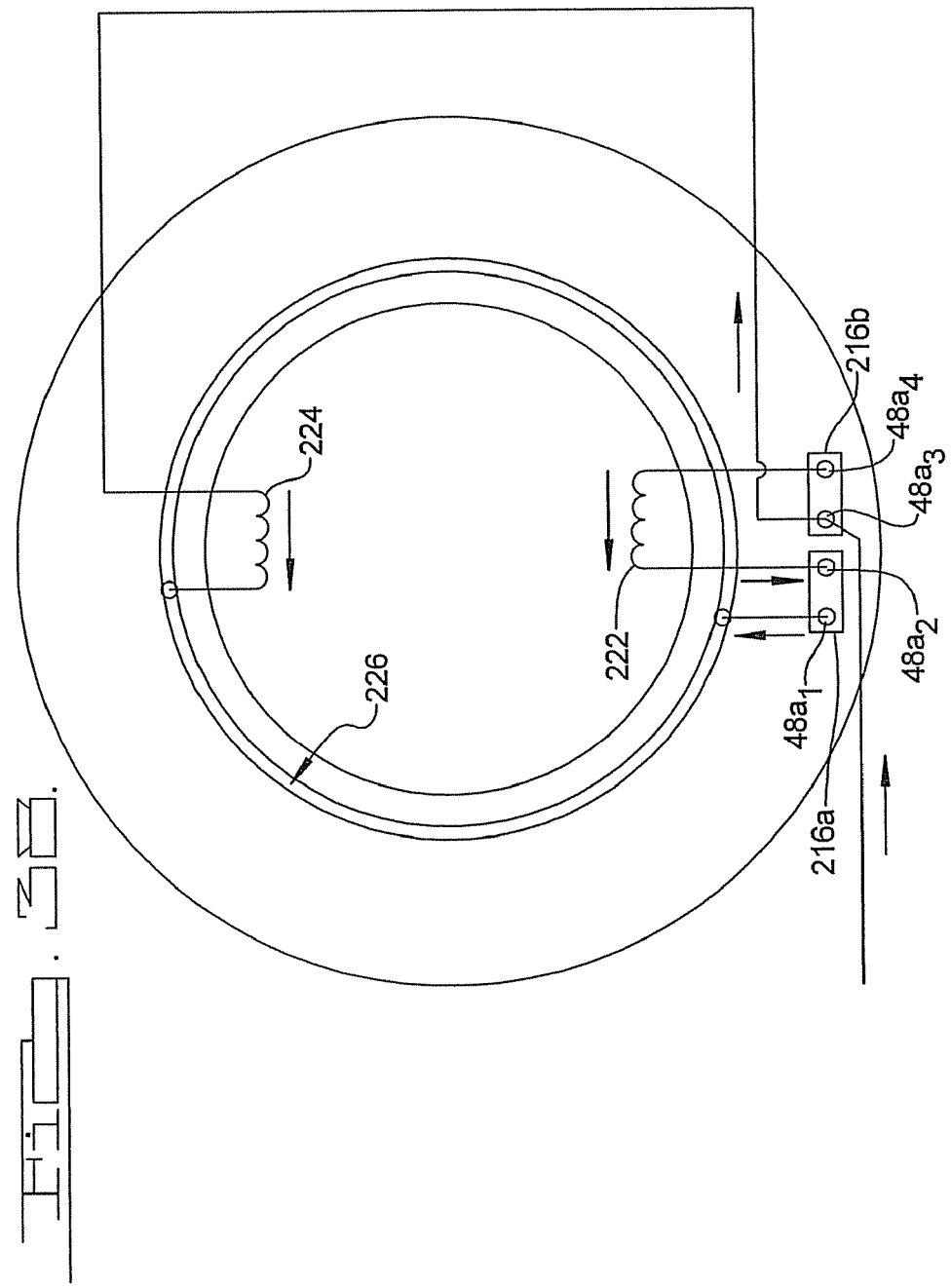
Figure 30:
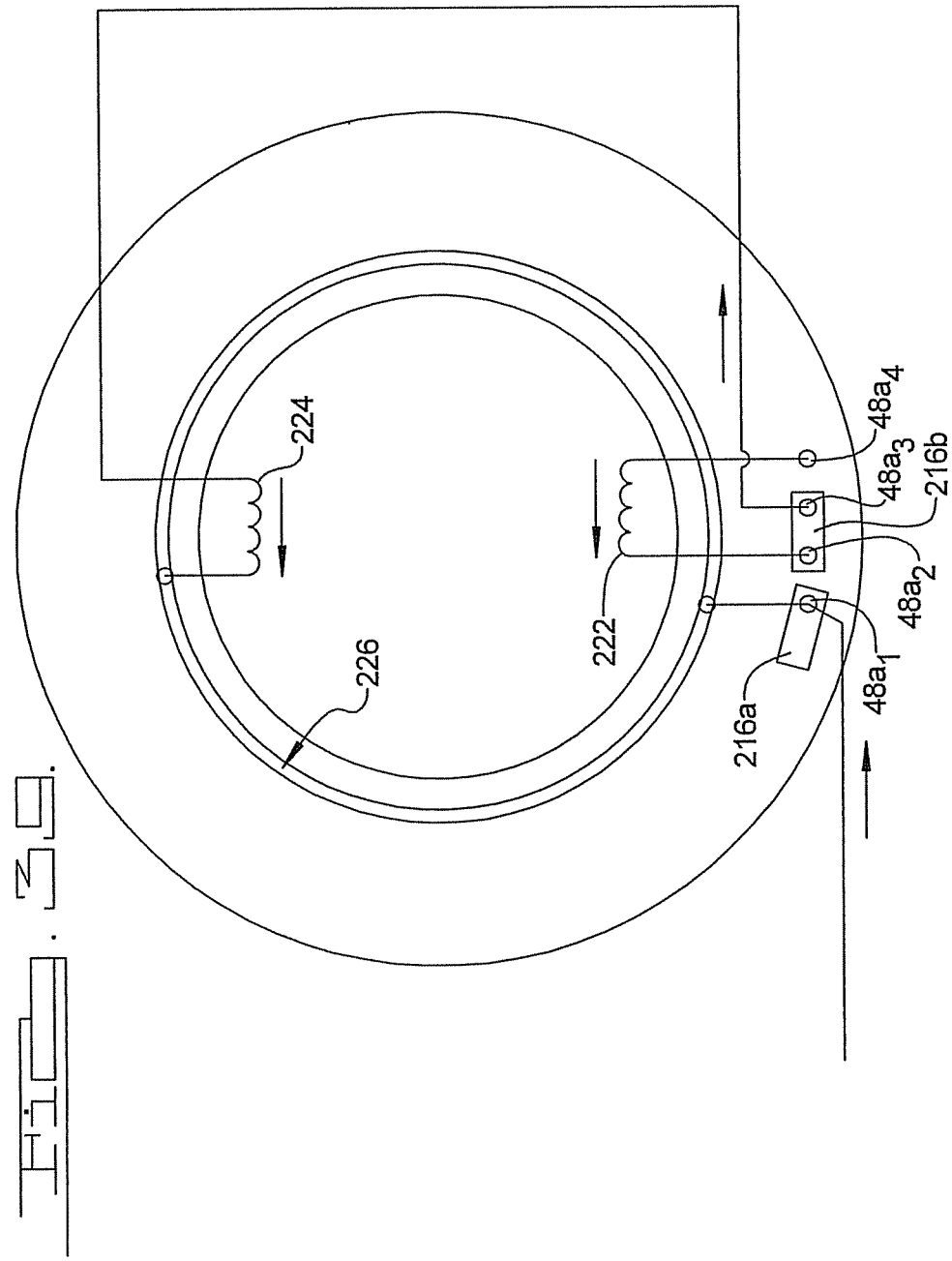
Figure 30A:
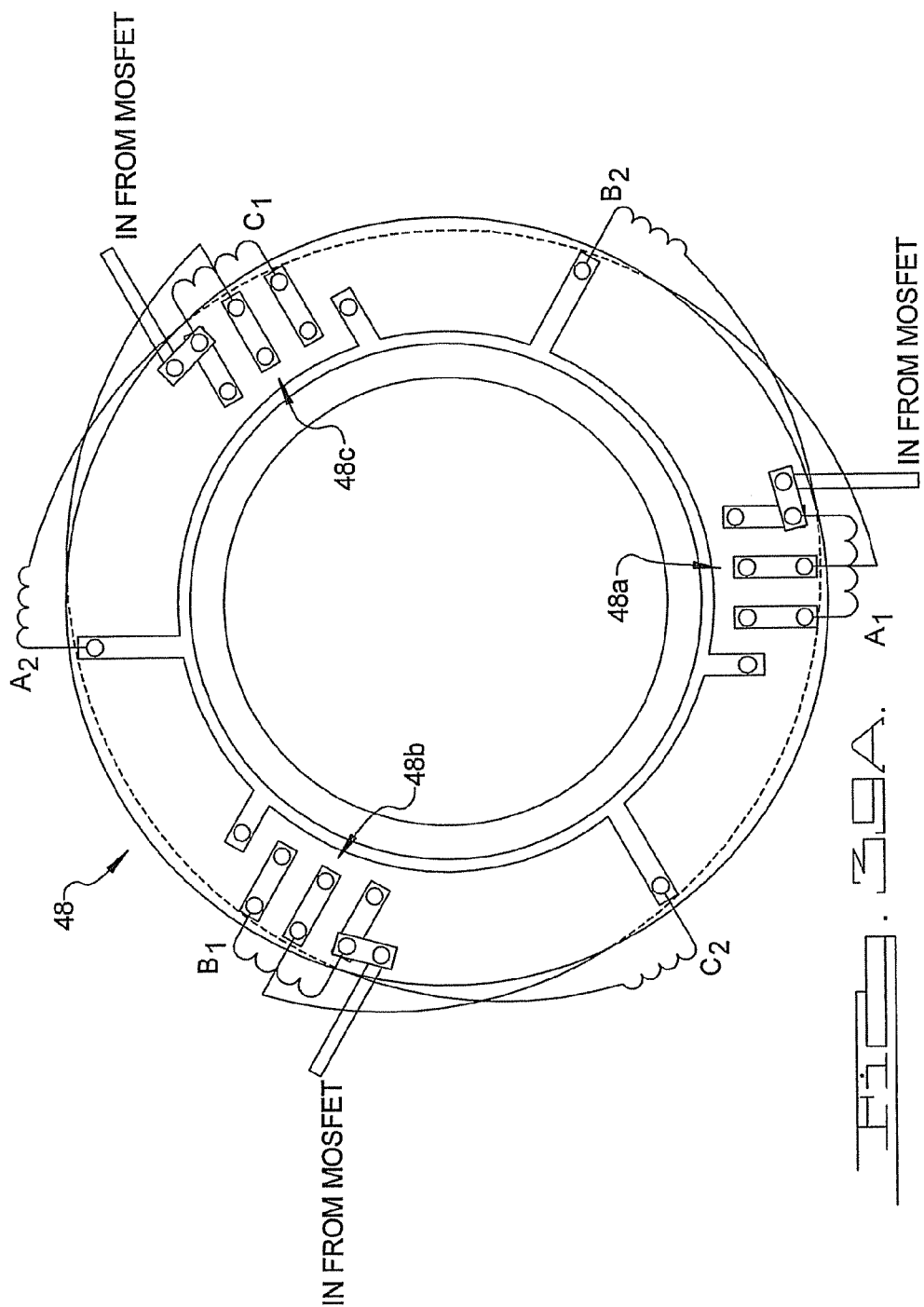
Figure 40:
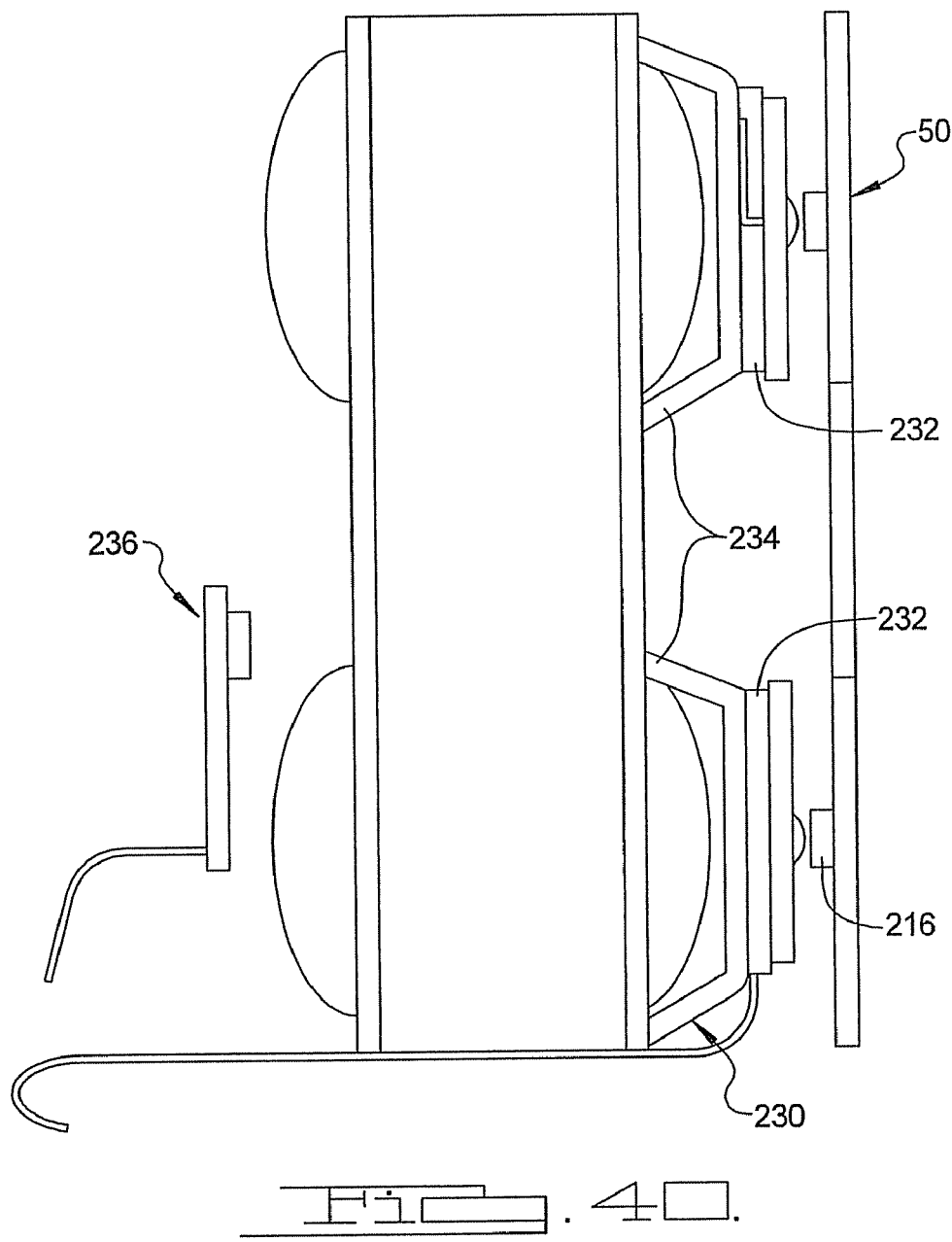
Figure 43:
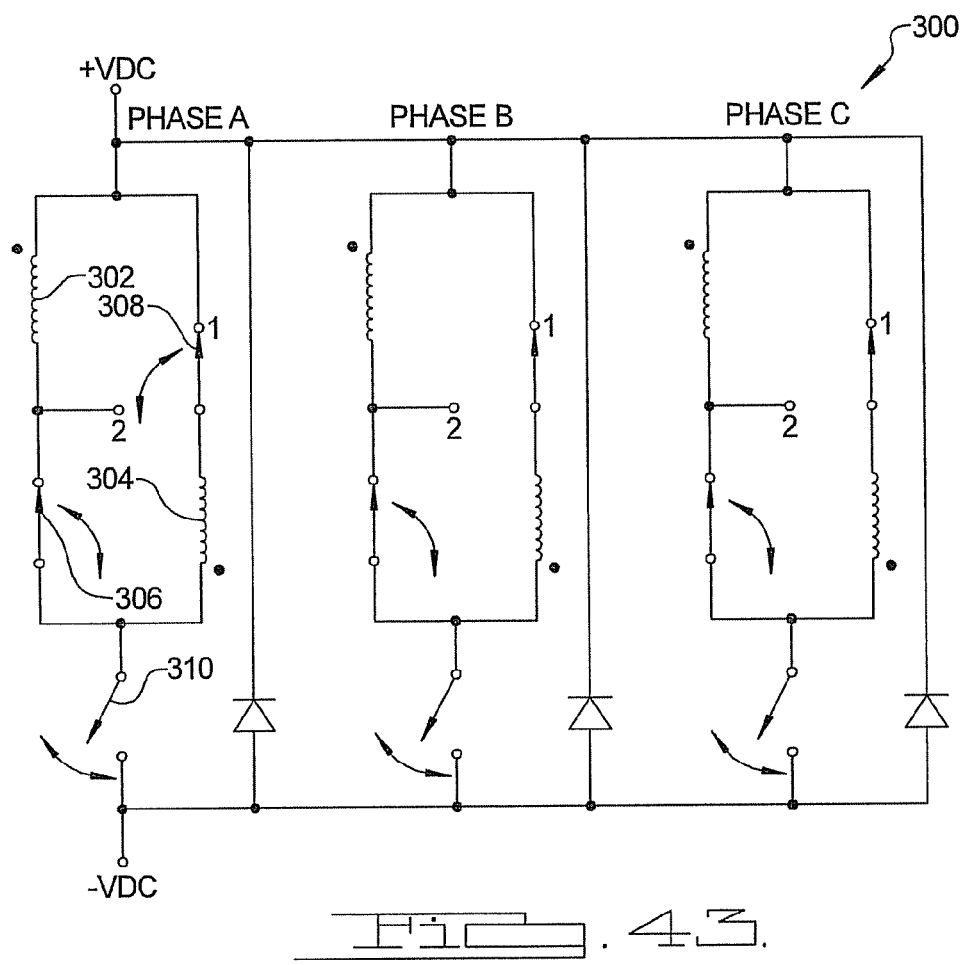

32 is a graph illustrating how the speed-torque performance of the new motor described herein is controlled by the controller of the motor system to essentially match, but not exceed, the speed-torque capability of the gear reduction unit;

FIG. 33 is a graph illustrating how the speed-torque performance of the new motor can be controlled by the controller of the motor system to match, and periodically exceed, for short durations, the speed-torque performance capability of the gear reduction unit;

FIG. 34 is a perspective view of a preferred embodiment of a new rotor for use with the motor described herein;

FIG. 34 is a simplified side view of a motor can within which a motor in accordance with an embodiment of the present disclosure is located, and illustrating an externally positioned, moveable contact ring for making the necessary connections to configure the coils in each phase winding of the motor in either series or parallel configurations;

FIG. 35 is a view of a rear surface of the contact ring in FIG. 35, in accordance with arrow 35 in FIG. 34, illustrating a user actuatable member used to rotate the contact ring;

FIG. 36 is a plan view of the contact ring taken in accordance with arrow 36 in FIG. 34, illustrating the conductive jumpers used to help make the series and parallel connections for the coils of each of the phase windings of the motor;

FIG. 37 is an end view of the motor can of FIG. 34 showing the arrangement of the connector blocks used to make the electrical connections to the phase coils of the motor mounted within the motor can;

FIG. 38 illustrates the jumper terminals being used to make connections to the connector block associated with the coils of Phase A of the motor, to place the pair of coils of the Phase A winding in parallel;

FIG. 39 illustrates the jumper terminals of FIG. 38 being used to connect the Phase A coils in series;

FIG. 39A illustrates one embodiment for connecting all of the phase coils of the motor to their respective connector blocks;

FIG. 40 illustrates a simplified side view of the motor of FIG. 34, showing a mounting structure that is used to support the connector block from a stator assembly of the motor;

FIG. 41 is a side view of another embodiment of the motor showing how the mounting structure can be used to support the connector ring inside of the motor can;

FIG. 42 illustrates the assembly of FIG. 41 in perspective to show a slot through which the drive pin can project out from the motor can;

FIG. 43 illustrates a switching subsystem that is used to couple the coils of each phase of a dual wound, brushless DC motor of the present disclosure in series and parallel configurations;

FIGS. 44-46 illustrate a switching sequence for switching one phase of the system shown in FIG. 43 from a parallel to a series configuration;

FIG. 47 illustrates a switching subsystem for switching the coils of a three phase brushless DC motor between delta and wye configurations;

FIG. 48 illustrates a the use of a plurality of diodes for forming a one way switch;

FIG. 49 illustrates the path of current flow through a first pair of the diodes, when current is flowing in a first direction;

FIG. 50 illustrates the path of current flow through a second pair of the diodes of the subsystem of FIG. 48, when current is flowing in a second direction;

FIG. 51 illustrates a graph showing several performance curves for a dual wound brushless DC motor, and illustrating the advantages that each of the series and parallel connection configurations provide;

FIG. 52 is a perspective view of an embodiment of a new rotor for use with the motor described herein;

FIG. 53 is an end view of the rotor of FIG. 52 in accordance with directional arrow 53 in FIG. 52;

FIG. 54 is an exploded perspective view of the rotor of FIG. 52;

FIG. 55 is an end view of an alternative construction of the rotor using permanent magnets each having an arc of 70°;

FIG. 56 is an end view of an alternative construction of the rotor using permanent magnets each having an arc of 60°; and FIGS. 57-59 are end views of alternative embodiments of the rotor having a back iron without weight reducing holes, and with permanent magnets having different arc dimensions.

DETAILED DESCRIPTION

The following description of various embodiment(s) and methods is merely exemplary in nature and is in no way intended to limit the present disclosure, its application, or uses.

Referring to FIG. 1, a power tool in the form of a drill 12 incorporating a motor system 10 in accordance with an embodiment of the present disclosure is shown. It will be appreciated immediately that while the power tool is illustrated as a drill 12, that the motor system 10 can be implemented in a wide variety of other power tools such as saws, sanders, routers, and virtually any other form of DC powered tool or device. The motor system 10, however, is expected to find particular utility with cordless power tools.

Referring further to FIG. 1, the exemplary drill 12 typically includes a chuck 14 coupled to an output of a gear reduction unit 16. An input of the gear reduction unit 16 is coupled to an output shaft 18 of an electronically commutated motor 10a of the system 10. A trigger 20 is used to turn on and off the motor 10a and may also be used to control the speed of the motor. A rechargeable battery 22 is held within or attached to a handle portion 24 of a housing 26 of the drill 12. A controller 28 is also disposed in the handle portion 24, but could instead be located at other locations within the tool 12. The controller 28 is in communication with the trigger 20 and the motor 10a. The controller 28 is used to control the motor 10a and will be described in greater detail momentarily.

Also in communication with the controller 28 is a user engageable selector 30. The selector 30 enables the user to select from one of a plurality of operating modes for the motor 10a that enable the operating characteristics of the motor 10a to be tailored to a specific task. For example, as will be described in greater detail in the following paragraphs, the user may use the selector 30 to select a high speed, low power output if a work task involves driving screws into a soft wood. The user may select a higher power output mode for the motor 10a if the work task involves drilling into a hardwood, where greater torque is required. A display 18 may be incorporated for displaying various operating modes of the motor 10a. The display 18 may comprise an LCD, LED, or any other suitable form of display device that has low power draw.

Referring to FIG. 2, a highly simplified block diagram of the motor system 10 components is shown. A conventional voltage regulator 34 is used to provide a regulated DC voltage to the controller 28 and other electronic components used in the drill 12. The controller 28 may be an 8-bit, 16-bit or more powerful controller, such as a digital signal processor (DSP). A MOSFET power bridge 36 is controlled by the controller 28 and used to provide drive signals to phase windings of the motor 10a. A motor speed sensor 38 may be used to sense the speed of the motor 10a, and a current sensing circuit 40 may be used to sense current flow through the motor and to apply a control signal to the controller 28 in accordance with the sensed current flow. A stator connection system 42 is employed in connection with the motor 10a to selectively connect the phase windings on the stator in various configurations to tailor the performance of the motor 10a to the required task. The stator connection system 42, as will be explained in the following paragraphs, may be a mechanical system in which one or more components are physically moved to make connections between various ones of the phase windings employed on the stator. Alternatively, the connection system 42 may form an electrical switching system that makes and breaks connections with various phase windings as needed to connect the windings in either a delta configuration or a wye configuration. The stator connection subsystem 42 may also be used to connect the various coils in each phase winding in series or parallel as needed to achieve specific operating characteristics for the motor 10a.

With further reference to FIG. 2, a temperature sensor 43 is used to monitor the temperature of the gear reduction unit 16, which forms the gear system for interfacing the output shaft 18 of the motor 10a to the chuck 14 of the drill 12. The temperature sensor 43 generates a signal representative of a temperature of the gears within the gear reduction unit 16. This signal is monitored and used by the controller 28 to help match the speed-torque performance curve of the motor 10a to that of the gear reduction unit 16. This enables most efficient utilization of the speed-torque performance capability of the gear reduction unit 16 without risking breakage or damage to the gear reduction unit. This feature will described in greater detail in the following paragraphs. The Components 28, 30, 18, 34, 38, 40, and 42 and 43 can be viewed collectively as a "control" section of the drill 12.

Figure 3:
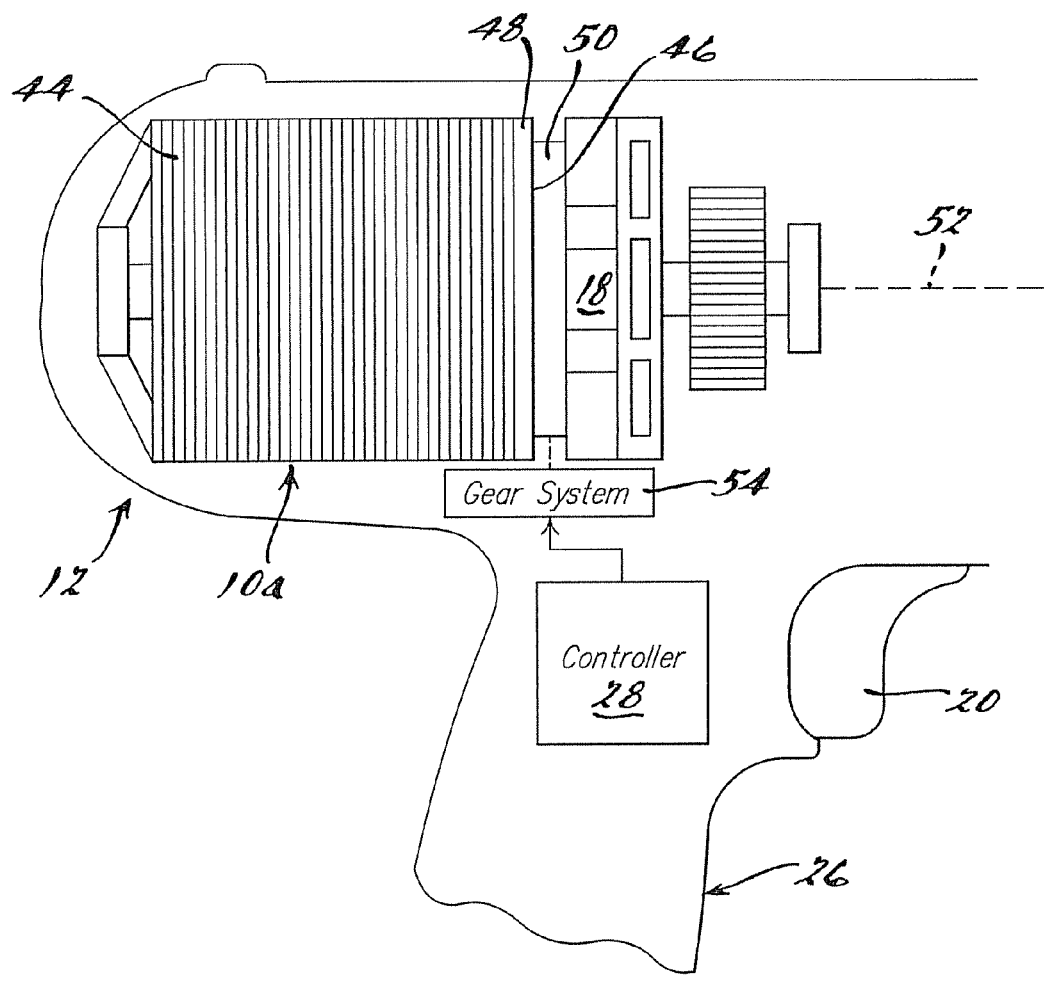
FIG. 3 is a simplified side sectional view of the power tool of FIG. 1 illustrating certain of the internal components of the power tool, and in particular the stator.
Figure 10:
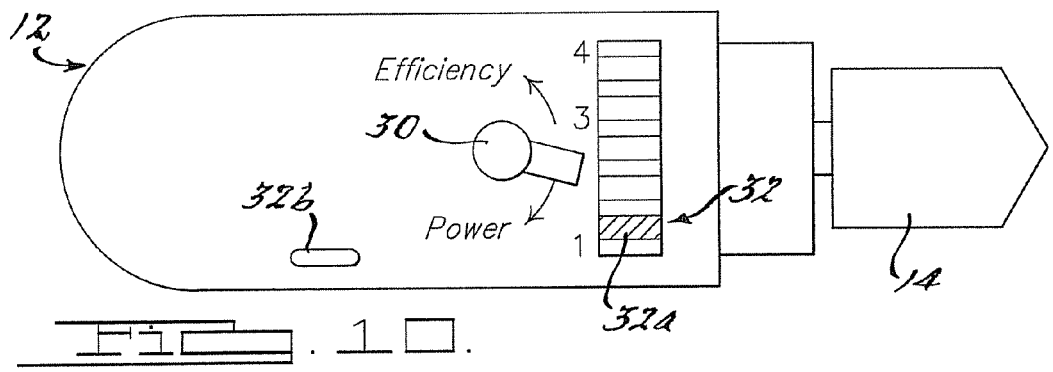
FIGS. 10-13 are top views of the power tool of FIG. 1 illustrating the selector switch and display system for displaying tool operating modes and battery charge level.
Figure 11:
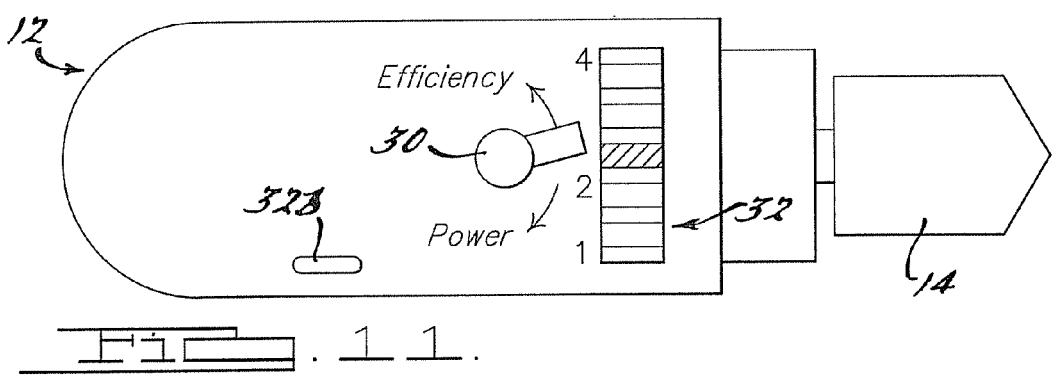
Figure 12:
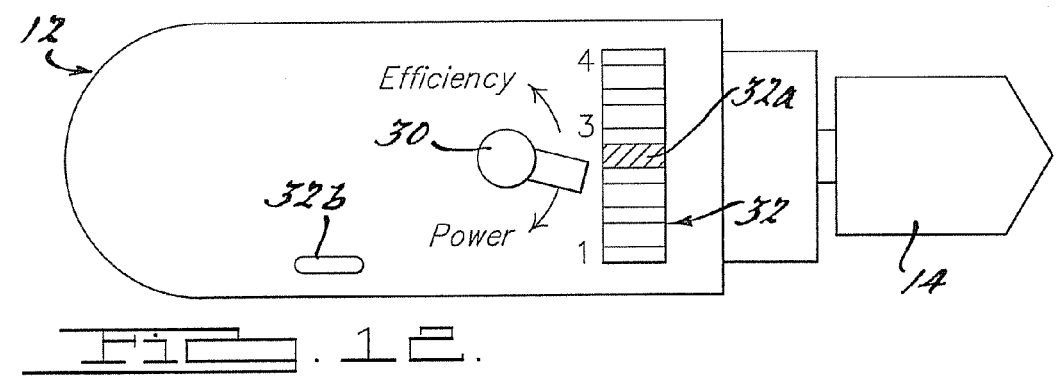
Figure 13:
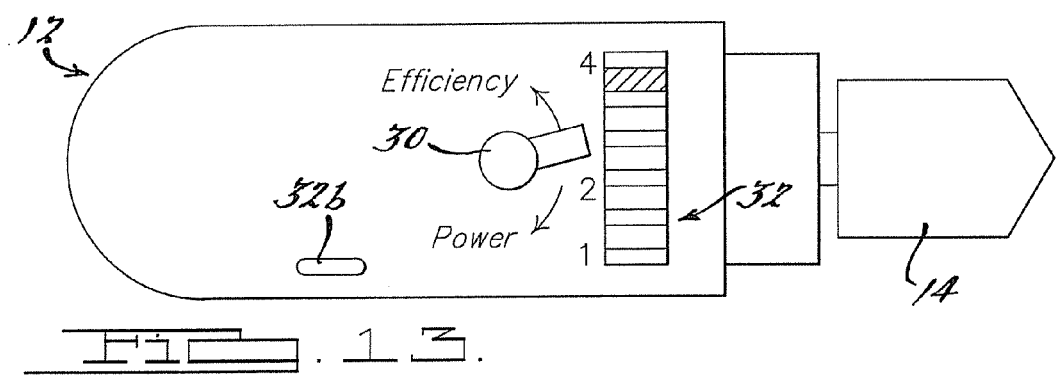

Referring to FIG. 3, a simplified side view of one preferred embodiment of the motor 10a inside the drill 12 is shown. The motor 10a includes a stator 44 having a forward end portion 46. In this embodiment a connector block 48 is supported adjacent the forward end portion 46. A movable contact ring 50 is positioned adjacent the connector block 48 and is movable rotationally about an axial centerline 52 extending through the motor 10a. The movable contact ring 50 may be moved rotationally about the axial centerline 52 by a suitable gear system 54. Components 48, 50 and 54, in this preferred embodiment, comprise the stator connection subsystem 42 illustrated in FIG. 2. Alternatively, any form of actuator capable of moving the contact ring 50 rotationally could be employed. The movable contact ring 50 is used to make electrical connections with contact points (not visible in FIG. 3) on the connector block 48 to selectively connect the phase windings (not visible) on the stator 44 in desired configurations. As used herein, the term "phase winding" is meant to include one or more coils that collectively make up the winding, whether the two or more coils are connected in series or parallel configurations, or a combination of series/parallel connections.

As mentioned previously, the connecting of the windings in desired configurations can also be accomplished completely electronically. This is done by replacing movable contact ring 50 with a suitable circuit assembly containing the necessary switching components for electrically making and breaking various contacts leading to the windings on the stator 44.

Delta and Wye Connection Schemes

Referring to FIGS. 4 and 5, diagrammatic end views of the stator 44 are shown to illustrate an exemplary wye coupling configuration (FIG. 4) and an exemplary delta coupling configuration (FIG. 5). Referring first to FIG. 4, the arrangement of windings in the wye configuration will be described. Coils 56A and 56B in this example are connected in series with one another and form a first phase winding 56. Coils 58A and 58B are similarly connected in series and form a second phase winding 58. Coils 60A and 60B are also connected in series and form a third phase winding 60. Coil 56A is connected to conductive contact points or pads 62 and 64. Coils 58A and 58B are connected to electrical contact points 66 and 68. Coils 60A and 60B are connected to electrical contact points 70 and 72. To place the windings 56, 58 and 60 in a wye configuration, one side of coil 56B is connected via a conductor 74 with an electrical contact point 76. One side of coil 58B is connected via conductor 78 with an electrical contact 80. One side of coil 60B is connected via electrical conductor 82 with an electrical contact point 84. Terminal block 86 resides on the movable contact ring 50 (FIG. 3) and when in the position shown in FIG. 4, electrically connects contact points 64 and 72. Terminal 88 similarly is positioned on the movable contact ring 50 and electrically connects contact points 76 an 80. Terminal 90, also positioned on the movable contact ring 50, electrically connects contact points 68 and 84. In the above-described arrangement, the windings 56, 58 and 60 are connected in a wye configuration.

Referring to FIG. 5, windings 56, 58 and 60 are illustrated connected in a delta configuration. This is achieved by shifting terminals 86, 88 and 90 (i.e., shifting the movable contact ring 50) rotationally counterclockwise in the drawing of FIG. 5. Thus, electrical contact points 62 and 84 are electrically connected, contact points 70 and 80 are electrically connected, and contact points 64 and 66 are electrically connected. Thus, by simply rotating the contact ring 50 a small angular distance, the windings 56, 58 and 60 can be quickly connected in either a delta configuration or a wye configuration.

FIG. 6 illustrates an alternative arrangement for electronically connecting the windings 56, 58 and 60 between a delta configuration and a wye configuration. This is accomplished by connecting one side of a thyristor 92 between one side of coil 56B and one side of coil 58A; connecting a thyristor 94 between one side of coil 58B and one side of coil 60A; and connecting one side of a thyristor 96 between one side of coil 60B and one side of coil 58A. A relay contact 98 is used to make or break electrical connections with contact points 100, 102 and 104 and 106. When the windings 56, 58 and 60 are to be connected in a wye configuration, thyristors 92, 94 and 96 are turned off and relay contact 98 is moved into electrical contact with electrical contacts 100, 102, 104 and 106. Relay contact 98 is associated with a conventional relay 108 that is controlled by the controller 28 (FIG. 2). Thus, contact points 100, 102, 104 and 106 form the wye "tie" point. When the configuration is to be changed from a wye to a delta, relay 108 is deenergized, which pulls relay contact 98 into the position shown in FIG. 6. Thyristors 92, 94 and 96 are then energized by signals from controller 28 applied to the gate of each thyristor.

Referring to FIG. 7, an alternative implementation of the circuit of FIG. 6 is shown that includes relay contacts 110, 112 and 114 in place of thyristors 92, 94 and 96, as well as thyristors 116 and 118 used in place of relay contact 98 and relay 108. The circuit of FIG. 7 allows for lower current flow through the electronics since each thyristor is not required to handle the full phase current through a given phase.

Referring to FIG. 8, still another alternative embodiment of the connection of the phase windings 56, 58 and 60 is illustrated. This embodiment uses thyristors 120, 122 and 124, together with thyristors 116 and 118, to form an all electronic switching circuit (i.e., no moving parts) for switching between wye and delta configurations for the windings 56, 58 and 60.

Referring to FIG. 9, a circuit diagram is presented that is similar to that of FIG. 8, but which also enables the windings 56, 58 and 60 of each of phases A, B and C to be coupled either in series or in parallel. This is accomplished by the use of three additional thyristors 126, 128 and 130, in each of the three phases. The operational sequence for each of the thyristors 126-130 in each of the three phases is identical, so only the operation for switching between series and parallel configurations for the coils 56A and 56B for phase A will be described.

When thyristor 126 is turned on by a signal on its gate, and thyristors 128 and 130 are turned off, coils 56A and 56B are connected in series. However, when thyristor 126 is turned off and thyristors 128 and 130 are both turned on, then the right side of coil 56B will be connected in parallel to the right side of coil 56A, and the left side of coil 56A will be connected in parallel to the left side of coil 56B. Coil 56A and 56B will thus be in parallel relative to points $A_1$ and $A_2$. Thyristor 120 is used in connection with thyristors 116 and 118 to switch phase A between delta and wye configurations relative to phases B and C, as described previously in connection with FIGS. 7 and 8.

Referring now to FIGS. 10, 11, 12 and 13, the description of the user selector 30 will be further described. The selector 30, in one preferred form, comprises a multi-position switch that can be manually positioned by the user between one of a plurality of positions to select one of a plurality of different modes. In the present example, four operating modes are shown. Mode "1" provides a maximum power mode, while mode "4" provides a maximum efficiency operation mode. In mode "4", for example, the power output from the motor 10*a*, in the fourth switch position, may be limited by the controller 28 to a maximum of, for example, 300 watts output. In the "1" position, the maximum power output of, for example, 600 watts is selected. The controller 28 also varies the motor 10*a* speed between a plurality of predetermined speeds, in accordance with the selector 30 position, to best suit the task at hand (i.e., either providing maximum power, maximum efficiency or some combination therebetween). As an example, switch position "1" may comprise a chuck 14 speed of 450 rpm, position "2" may comprise a speed of 850 rpm, position "3" a speed of 1400 rpm and position "4" a speed of 2,000 rpm. Alternatively, the selector 30 may be coupled to the gear reduction unit 16 such that the selector is moved automatically from one mode to another mode as the controller 28 senses the load on the motor 10*a*. For example, the controller 28 may be used to switch from a maximum efficiency mode (i.e., mode 4) to an intermediate mode (i.e., mode 2) momentarily if an additional degree of motor loading is sensed. The additional degree of loading is sensed by an increase in the current draw by the motor 10*a*. If the period of increased load abates, then the controller 28 may again switch the operational mode back to the mode selected by the user. The controller 28 maybe implemented in a closed loop scheme or an open loop scheme to switch the connections between the phase windings 56, 58 and 60 between delta and wye configurations, as well as the connections of the coils between series and parallel, depending on one or more sensed operating parameters such as speed or torque.

Display 18 may comprise a first plurality of LEDs 18*a* for indicating to the user that the controller 28 has overridden the operating mode selected by the user, and provide an indication as to which operating mode the motor 10*a* is presently operating in. LED bank 18*b* may be used to indicate a level of charge of the battery 22 of the drill 12.

Switching the windings 56, 58 and 60 of the stator 44 is performed to match the operating characteristics of the motor 10*a* to the particular application or task being performed by the drill 12. In this manner, a lower power output, can be selected, when performing tasks that only require low motor power, which will help to conserve available battery power.

Performance Characteristics of Wye and Delta Winding Configurations

Figure 14:
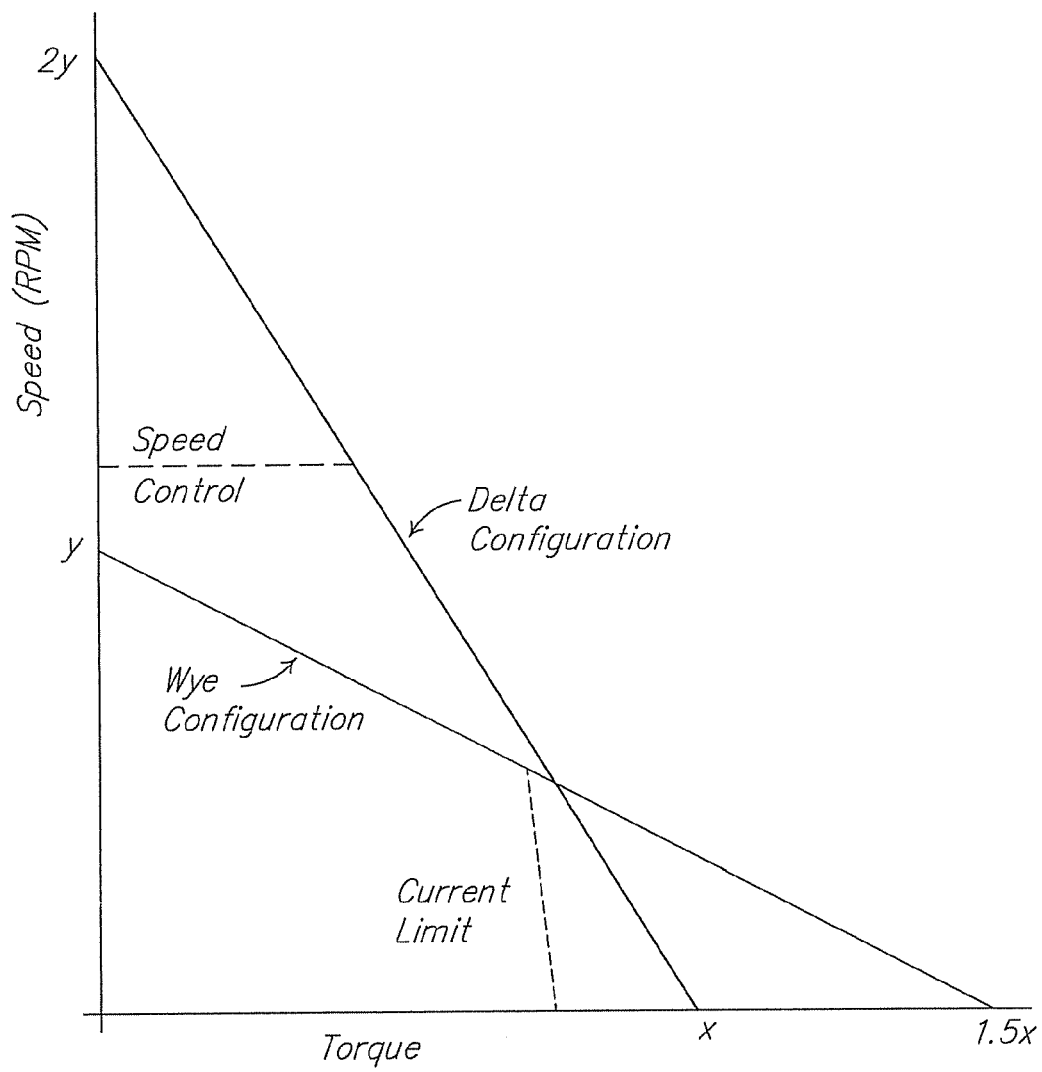
FIG. 14 is a comparison graph of the speed/torque relationship for delta and wye winding connection configurations.

Providing a motor that is capable of the above-described operating modes requires considering fundamental operating characteristics of an electronically commutated motor. For example, a motor designed for higher power becomes less efficient at low torque and high speed applications, such as when driving small screws or drilling small holes in soft wood. The main reason for this is that a motor designed for maximum power will have a low torque-per-amp ratio as a result of having a high no-load speed and a low number of coil turns. FIG. 14 illustrates a graph comparing the speed/torque characteristics of the motor 10a when wye and delta winding configurations are used. The delta configuration produces higher power output and has high thermal efficiency. Efficiency is good at high load but less at low loads. Speed control is typically needed to limit the no-load RPM of the motor 10a. The wye configuration produces a lower maximum power output and has lesser thermal capability. Efficiency is good at low load but drops off at high loads. Current control is typically needed to limit the stall current to prevent thermal runaway.

However, by enabling the coils of each phase winding of the motor 10a to be coupled in either series or parallel configurations, the operating characteristics of the motor can be tailored to provide either maximum power or maximum efficiency, or some intermediate power mode. When the coils in each phase are connected in series, the motor 10a will produce half of the power and will operate at half of the no load speed, as compared to what would be obtained with the coils in each phase being connected in parallel. However, connecting the coils of each phase in series will produce twice the torque-per-amp ratio that would be achieved when the coils are coupled in parallel. Accordingly, with the coils connected in series, the motor 10a will only draw about half the current for the same low torque, high speed applications. Thus, connecting the coils in each phase in series will improve the run time of the battery 22, powering a given motor, on a given charge.

Figure 15:
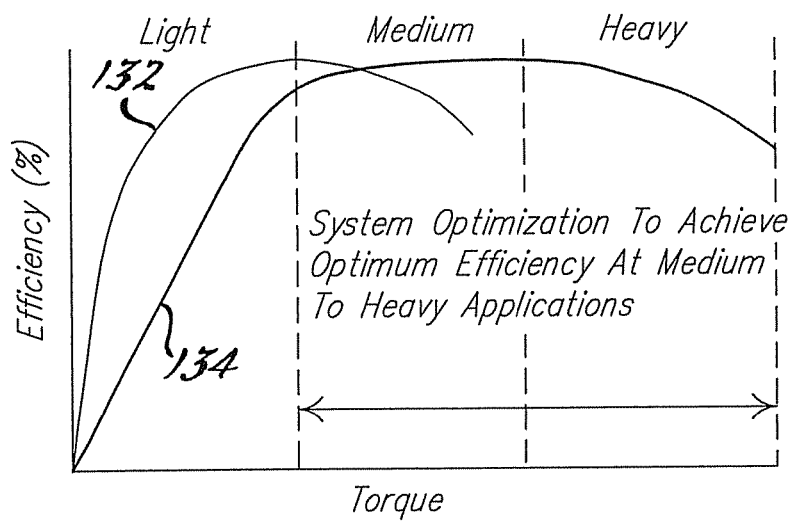
FIG. 15 is a graph illustrating the relationship of motor efficiency to the available torque output of the motor in "Light", "Medium" and "Heavy" drilling applications.
Figure 16:
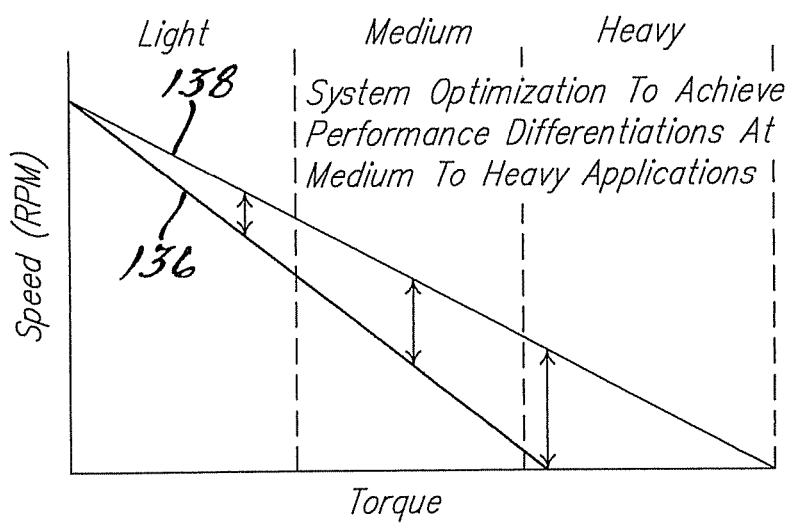
FIG. 16 is a graph illustrating the relationship of motor speed to torque in each of "Light", "Medium" and "Heavy" drilling applications.

Referring briefly to FIGS. 15 and 16, graphs are presented illustrating the different efficiencies and torques produced in different operating modes of the motor 10a. In FIG. 15, operating the motor 10a in a maximum efficiency mode, for example mode "1", produces an efficiency/torque curve represented by curve 118. Operating the motor 10a in a maximum "power" mode produces an efficiency/torque curve represented by curve 134. FIG. 16 illustrates that the speed of the motor 10a can be controlled to tailor it to either light, medium or heavy duty applications requiring differing degrees of torque output. Curve 136 and curve 138 illustrate the use of a higher motor speed (i.e., curve 138) to achieve maximum torque for heavy duty applications.

Figure 17:
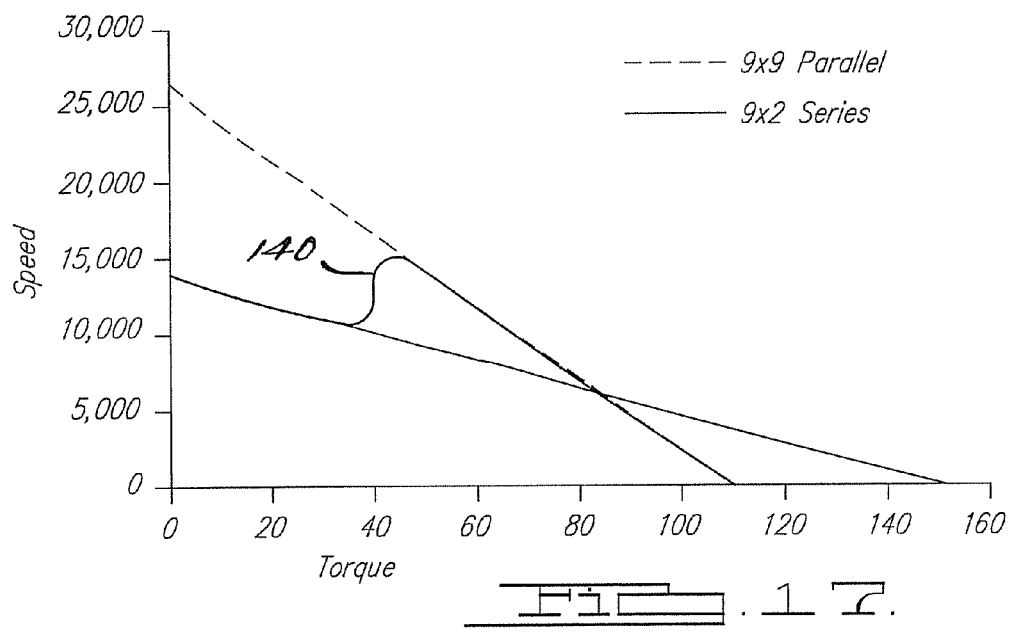
FIGS. 17-22 are graphs showing various relationships between speed, power, motor current, and motor efficiency.
Figure 18:
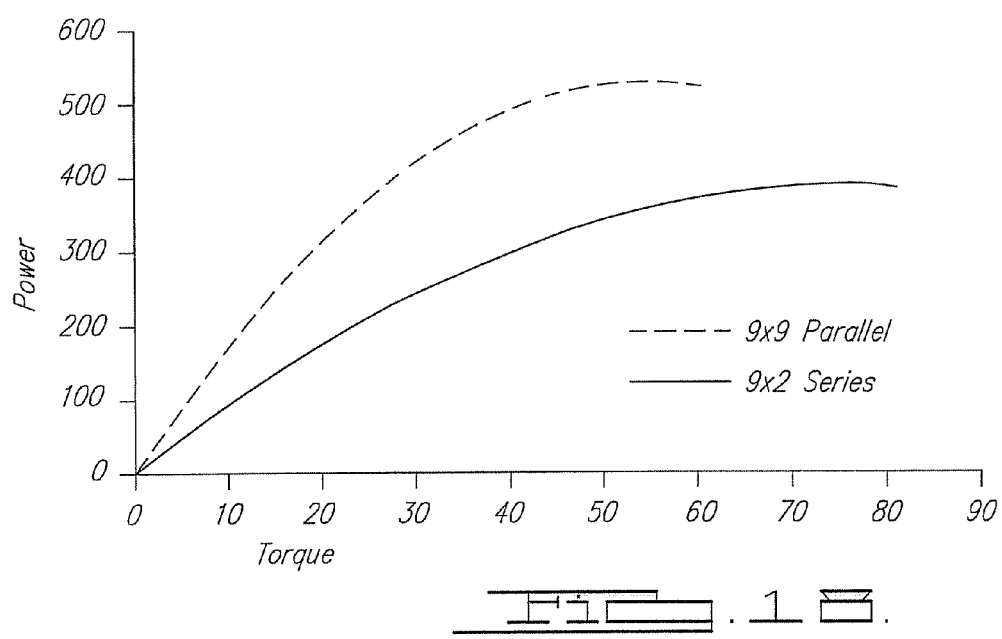
Figure 19:
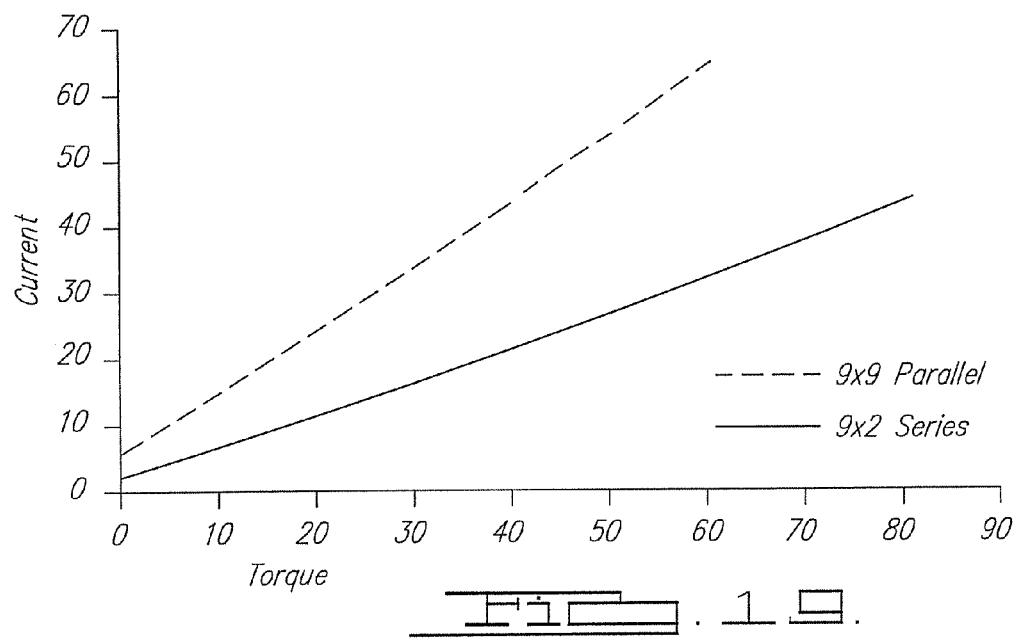
Figure 20:
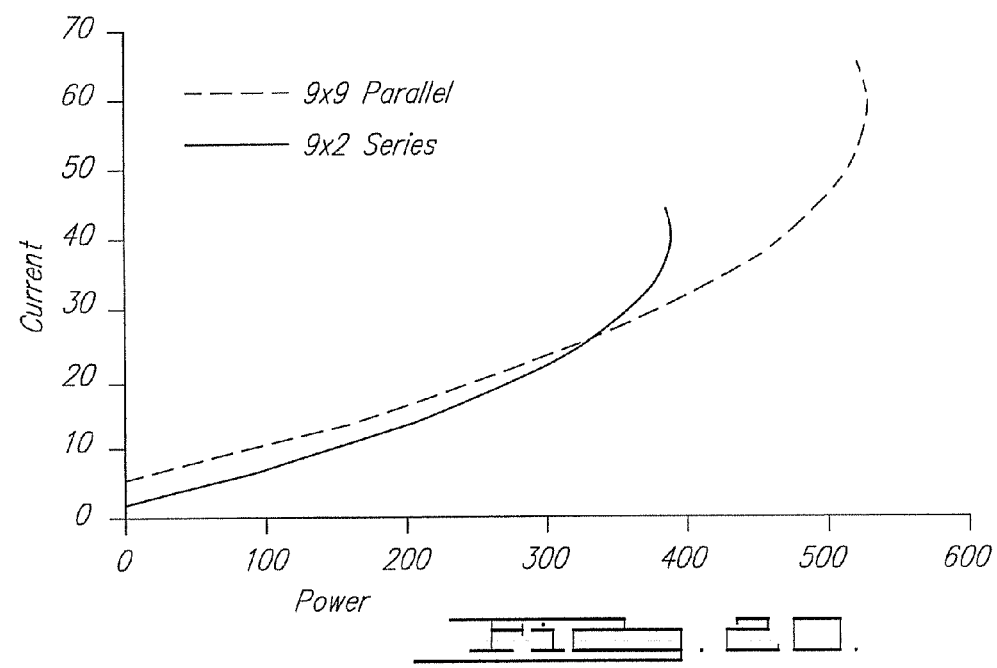
Figure 21:
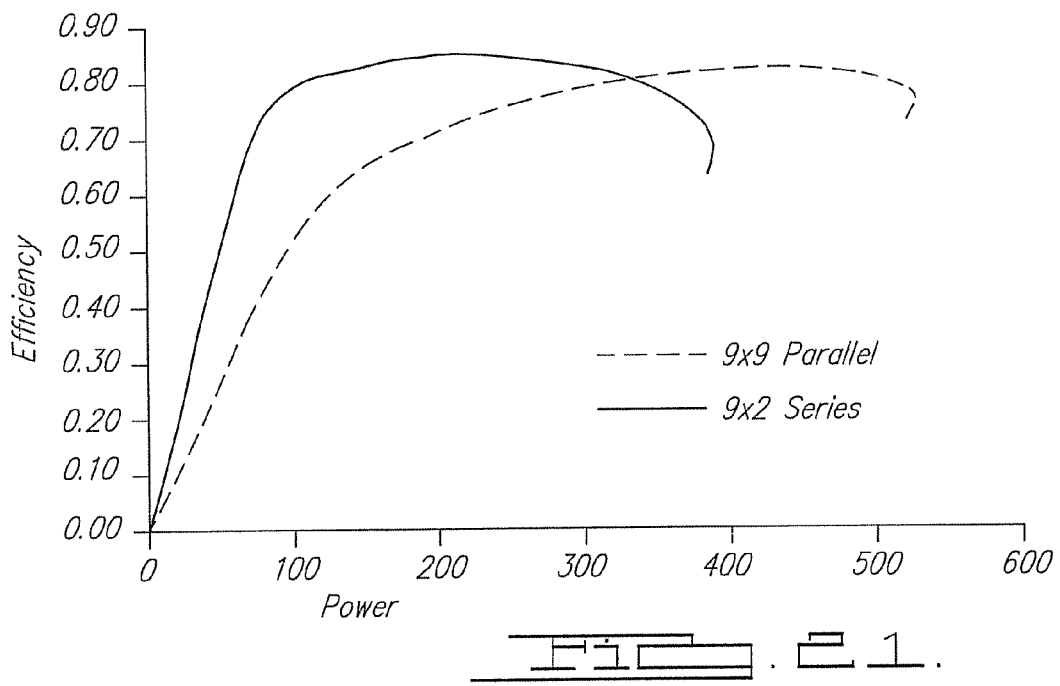
Figure 22:
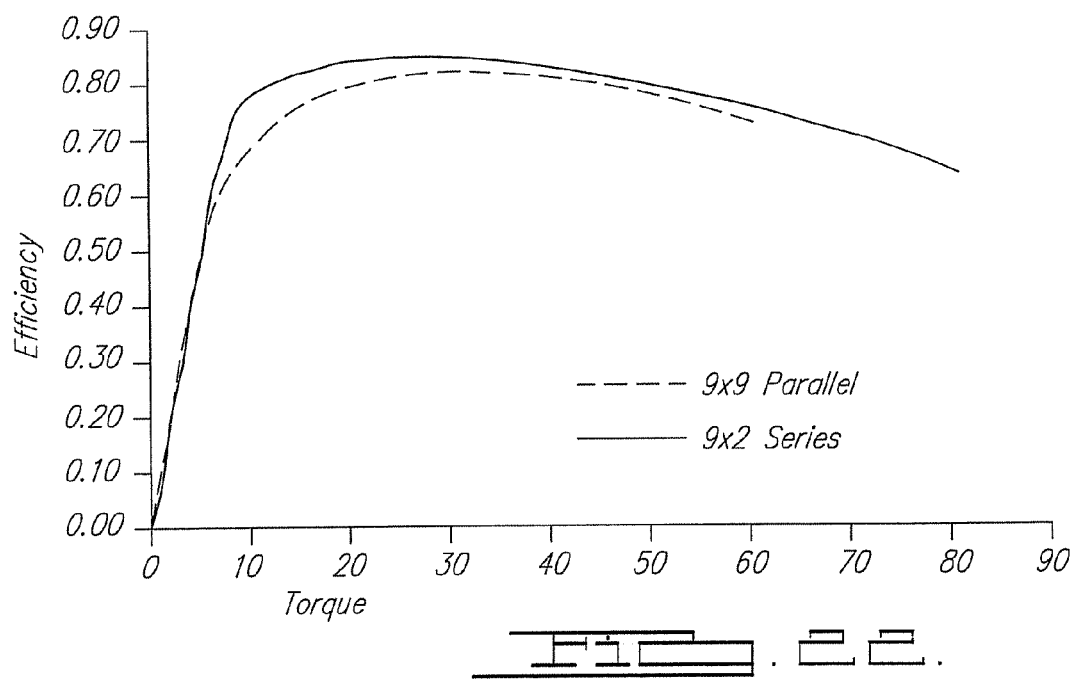

FIGS. 17-22 illustrate comparison graphs between parallel connected coils and series connected coils in the three phase windings 56, 58 and 60. FIG. 17 illustrates how the coils can be switched when operating a tool to virtually instantly change the operational characteristics of the tool. The changeover from series to parallel connections (or vice versa) could be a "hard" changeover, in which the electrical connections are changed without any electrical "smoothing" of the transition. Such a changeover is illustrated by curve 140 in FIG. 17. Once the motor 10a speed drops to about 11,000 rpm, the series connections of the coils 56A/56B, 58A/58B and 60A/60B are changed to parallel connections, thus providing greater power output from the motor 10a. The advantage this provides is that the tool incorporating the motor 10a will have significantly increased run time, for a given motor and battery charge, during light load work tasks as compared to what could be achieved with parallel connected coils. However, switching the coil pairs 56A/56B, 58A/58B and 60A/60B to parallel connections enables the maximum power output of the motor 10a to be increased beyond what would be possible with series connected coils. This makes more power available from the same motor 10a when performing heavy load work tasks.

Figure 23:
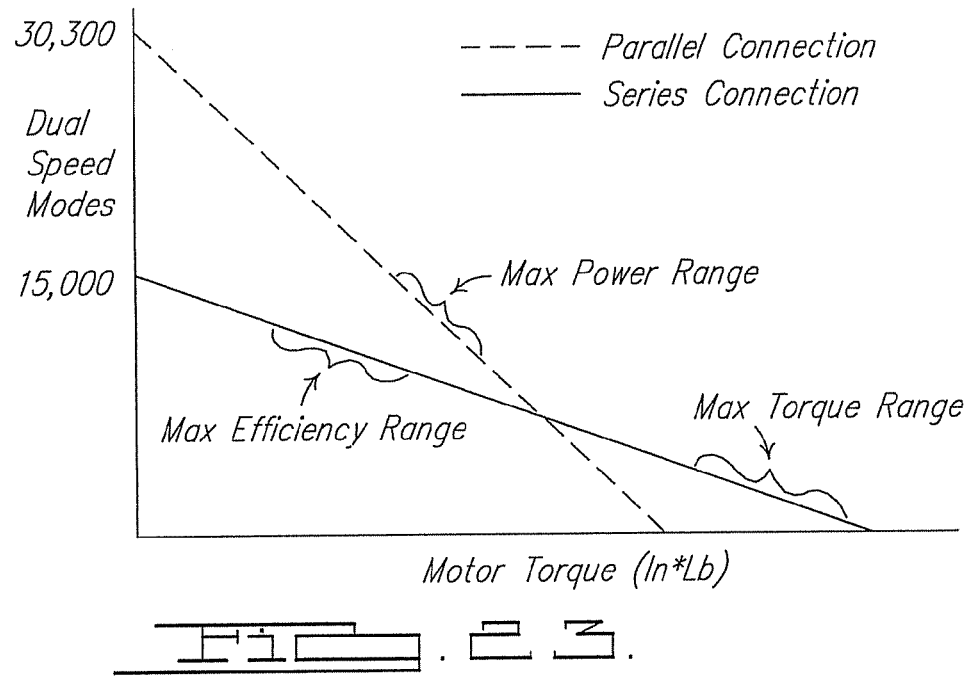
FIG. 23 is a graph illustrating a pair of speed/torque performance curves representing series and parallel coil connections, and further illustrating the maximum power range, maximum torque range and maximum efficiency range of the motor using the parallel and series connections of the coils.

For the drill 12, connecting the coils 56A,56B, 58A,58B and 60A,60B in each phase windings 56,58,60 between series and parallel configurations enables the output characteristics of the motor 10a to be changed in real time. Referring to FIG. 23, the series connection provides a maximum efficiency range and a maximum torque range. The parallel connection, however, provides a maximum operating speed and a maximum power range.

Figure 24:
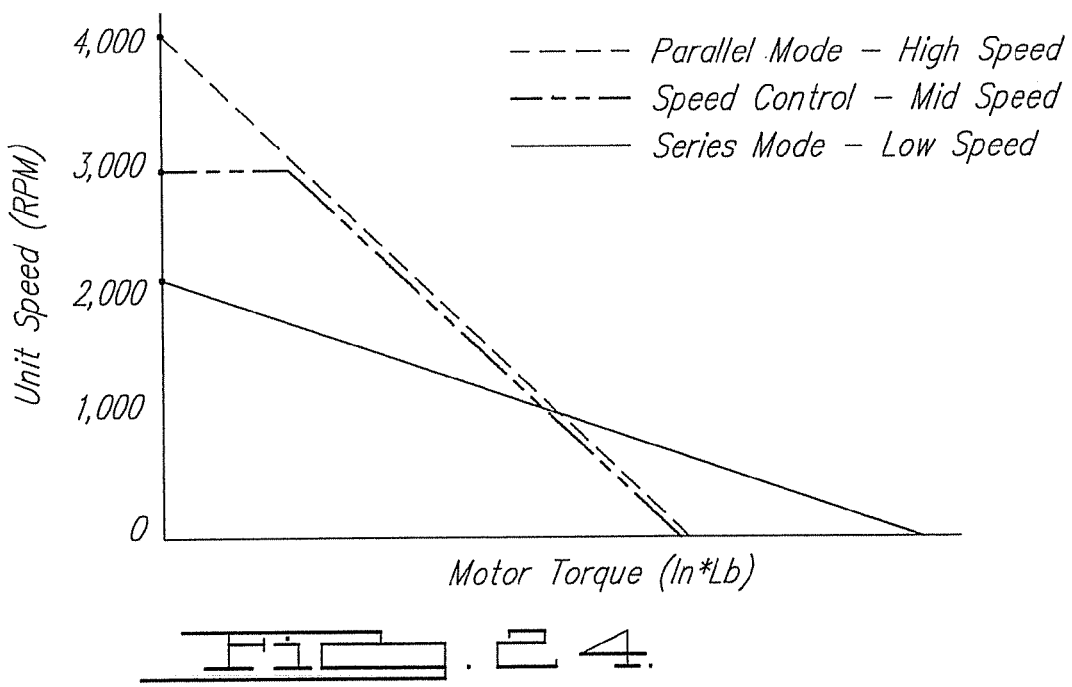
FIG. 24 is a graph illustrating three motor performance curves to show how the use of speed control can be implemented to produce a speed/torque performance curve that is a modification of the curves produced by the parallel and series connected coils.

FIG. 24 illustrates how the motor 10a output characteristics can be changed by a combination of series/parallel switching and using the gear reduction unit 16 to further tailor the output speed. In a power saw application, this would be especially useful for tailoring the speed of the saw blade to optimize performance of the saw when cutting different types of materials (e.g., soft woods versus hardwoods) and/or when using different types of saw blades.

Figure 25:
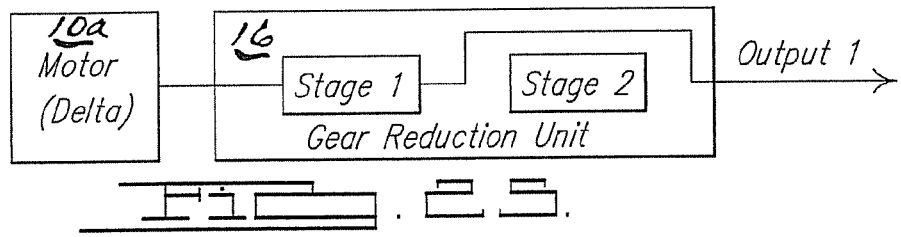
FIGS. 25-30 illustrate simplified schematic representations of the motor and gear reduction unit and how a plurality of different outputs can be obtained using the delta/wye connecting configuration, in connection with different internal stages of the gear reduction unit.
Figure 26:
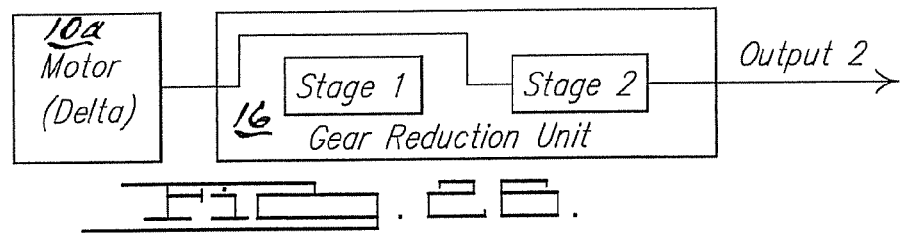
Figure 27:
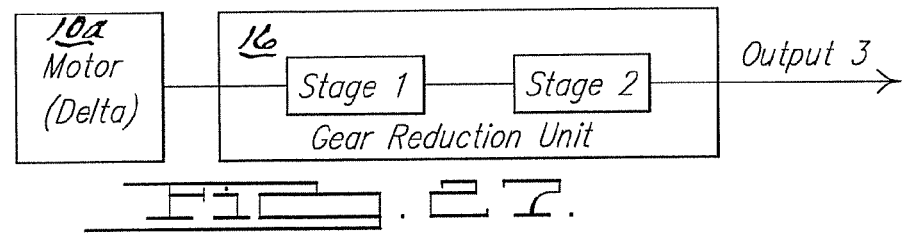
Figure 28:
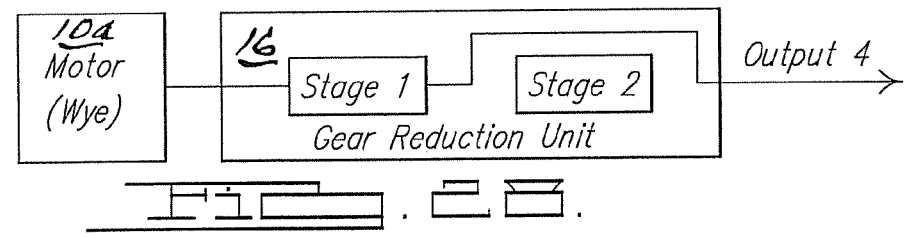
Figure 29:
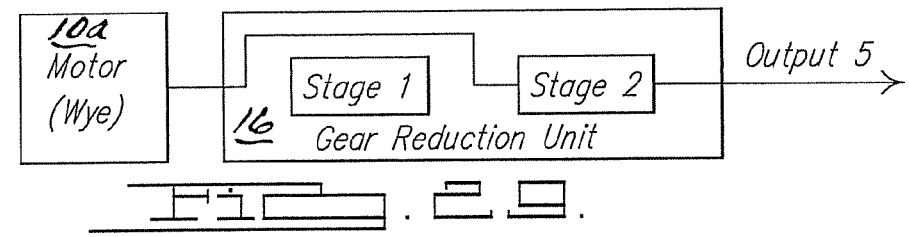
Figure 30:
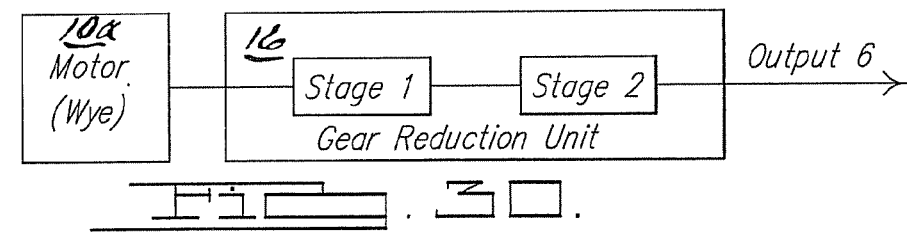

Obtaining Increased Number of Motor Performance Output Curves By Control of Motor and Gear Reduction Unit The motor 10a and the gear reduction unit 16 can be controlled by the controller 28 to provide a number of unit 16 output speeds that exceeds the number of difference speeds that can be implemented by only controlling the gear reduction unit 16 . For example, with reference to FIGS. 25-30, a plurality of simplified diagrams are shown illustrating one embodiment of the gear reduction unit 16, which in this example comprises a two stage gear reduction unit. Through just selection of various ones of the stages of a two stage gear reduction unit, three different output speeds could be obtained from the motor/gear reduction unit combination, as shown in FIGS. 25-27. However, the ability to connect the windings 56,58,60 of the motor 10a in either delta or wye arrangements enables a total of six different output speeds to be obtained from the two stage gear reduction unit 16. This enables a less costly, smaller and lighter weight gear reduction unit to be employed to provide a given number of different output curves, than what would otherwise be required without the delta and wye connection capability. The use of a smaller, lighter gear reduction unit in a hand-held power tool is especially advantageous, where weight and the dimensions of the tool are important design considerations.

If the series/parallel switching of the coils 56A/56B, 58A/58B,60A/60B is implemented together with the delta/wye selective switching, then an even greater number of motor speeds can be realized from the two stage gear reduction unit in FIGS. 25-30. In this example an extra six output speeds can be obtained for a total of twelve different speeds from only the two stage gear reduction unit 16. Advantageously, this is accomplished without the need to electronically limit the no-load motor 10a speed.

The ability to combine the connection configuration of the motor windings 56,58,60 (i.e., delta/wye), the connection of the coils 56A/56B,58A/58B,60A/60B (in series or parallel), and the electronic control of the gear reduction unit 16 makes it possible to obtain a wide range of outputs having various performance characteristics. For example, connecting each coil pair 56A/56B,58A/58B,60A/60B of the stator 44 in series will provide a higher efficiency at a given low power output than what could be achieved with the connected in parallel (see FIG. 35), for the same motor. Thus, the series configuration for the motor coils 56 could be used with a high speed gear ratio of the gear reduction unit 16 to optimize the drill 12 for use with driving small screws or drilling with small diameter drill bits, where a high motor speed is desirable. Conversely, the parallel connection of the coils 56A/56B,58A/58B,60A/60B (which provides a greater maximum power output) could be used in connection with a lower speed gear ratio. This combination would provide maximum application speed and thermal stability for heavy duty work tasks. Thus, it will be appreciated that a wide range of various motor outputs having various speed/torque/power/efficiency characteristics can be achieved through selective switching of the windings 56,58,60, the coils in each winding, and control of the gear reduction unit 16.

Figure 31:
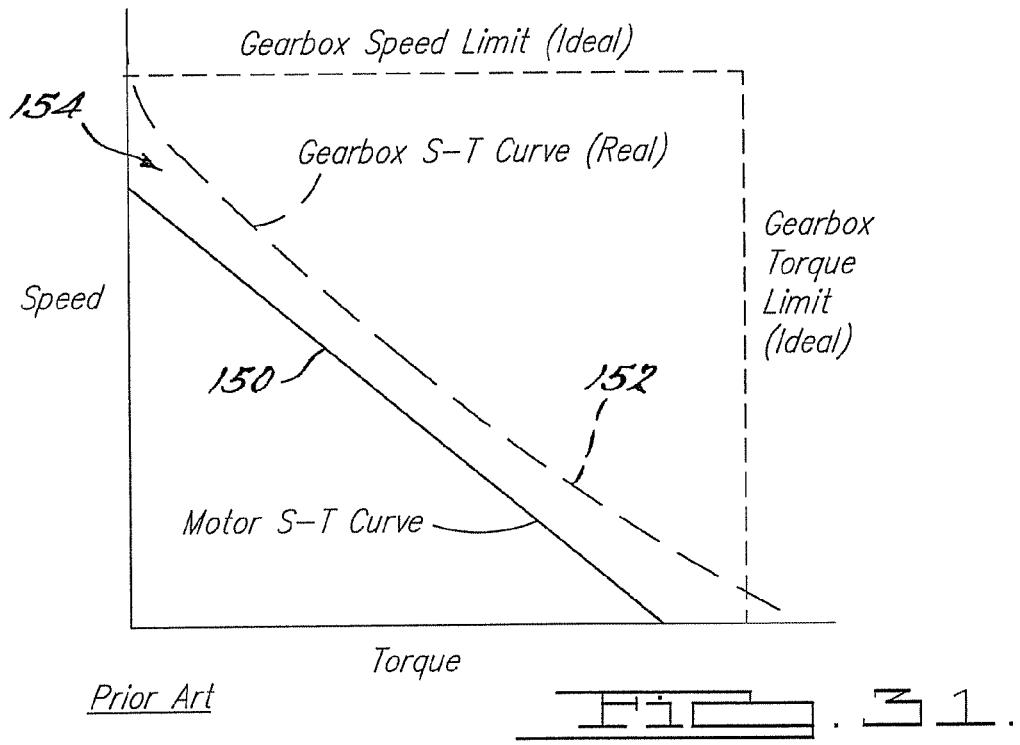
FIG. 31 is a graph of a conventional speed-torque curve of an electric motor and a speed-torque performance curve of a typical gear box, illustrating the typical speed-torque "headroom" that needs to be designed into the gear box.

Using Controller To Match Motor Speed-Torque Curve to Gear Reduction Unit Speed-Torque Capability The controller 28 can also be used to match the motor 10a speed-torque performance curve to the gear reduction unit 16 speed-torque performance curve. This eliminates the need to design in a sufficient amount of speed-torque "headroom" into the gear reduction unit 16 to ensure that the motor 10a will not damage or unduly stress the gear reduction unit 16 during operation of the drill 12. With brief reference to FIGS. 31-33, this feature can be further explained. FIG. 31 illustrates an exemplary degree of typical "headroom" that needs to be designed into a gear reduction system (often termed simply a "gear box") to ensure that the motor with which it is used will not damage or unduly stress the gear system. Curve 150 represents an exemplary speed-torque performance curve of a DC motor, and curve 152 represents an exemplary speed-torque performance curve of a conventional gear box. The speed-torque "headroom" designed into the gear box is represented by the area 154 between the two curves 150 and 152. Area 154 is essentially the added degree of speed-torque handling capability designed into the gear box beyond what the motor is capable of developing. This headroom ensures that the motor cannot over stress or damage the gear box.

Figure 32:
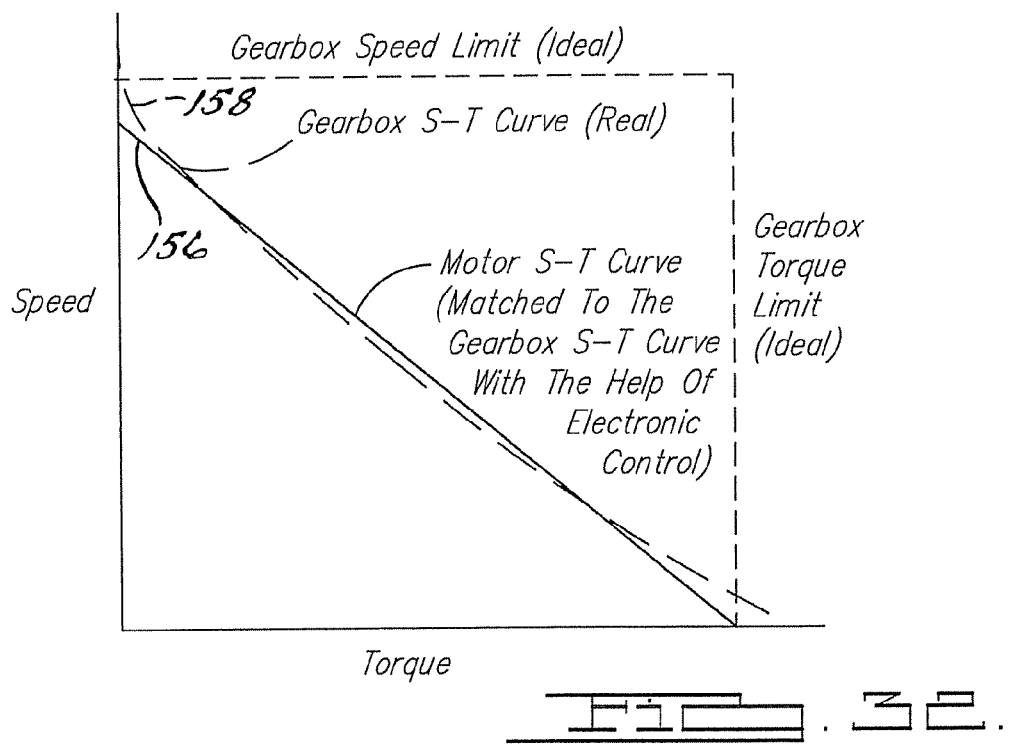

FIG. 32 illustrates controlling the motor 10a speed-torque characteristics to essentially "push" the motor speed-torque performance curve up to match the maximum speed-torque performance capability of the gear reduction unit 16. In this example, curve 156 represents the motor 10a speed-torque performance curve that the controller 28 implements for the motor 10a. Curve 158 represents the speed-torque performance curve designed into the gear reduction unit 16. The controller 28 controls the motor 10a to "push" or increase the speed-torque curve for the motor 10a up to essentially match the speed-torque curve of the gear reduction unit 16. This allows most efficient use of the speed-torque capability of the gear reduction unit 16 by eliminating the headroom area 154 that would normally be designed into the gear reduction unit 16. By monitoring important motor operating characteristics such as motor speed and motor current, the controller 28 ensures that the motor 10a operation does not at any time exceed the speed-torque performance capability of the gear reduction unit 16. Conversely, by using the controller 28 to monitor and closely control the motor 10a speed-torque performance capability, a less expensive gear reduction unit could be implemented for a given motor.

Referring to FIG. 33, an alternative control methodology can also be employed in which the controller 28 controls the motor 10a speed-torque performance so that it is only periodically increased, for short durations, to that of the gear reduction unit 16. Curve 160 represents a constant motor 10a speed-torque curve implemented by the controller 28. Curve 162 illustrates the operating points of the speed-torque curve 160 being increased by the controller 28 to periodically "push up" to the speed-torque curve 164 of the gear reduction unit 16 for short durations. In this way, the motor 10a can be controlled by the controller 28 to match, or even slightly exceed, the speed-torque performance capability of the gear reduction unit 16 for short durations that do not unduly stress or give rise to a risk damaging the gear reduction unit. This will also allow a less expensive and less robust gear reduction unit to be used, since the gear reduction unit will not need to be designed with sufficient headroom to be able to continuously accommodate the full speed-torque capability of the motor 10a.

Using Controller To Further Tailor Motor Operating Characteristics

In any of the connection configurations of the phase windings 56, 58 and 60, the controller 28 may implement commutation advance and voltage control to provide still further tailoring of the efficiency/torque and speed/torque curves described above. Additionally, the maximum current (i.e., stall current) of the motor 10a can be controlled by the controller 28. For example, the controller 28, as it senses the current being drawn by the motor 10a, can ramp down the torque output of the motor after a predetermined time limit of maximum current draw has been exceeded. For example, if the stall current lasts for longer than two seconds, the controller 28 can ramp down the torque output of the motor 10a to a predetermined lower level to prevent excessive current draw on the battery 22.

Still further, a pulse mode (i.e., low power mode) could be implemented by the controller 28 to notify the user that the drill 12 has entered a protected mode due to the above-described stall condition. Using the selector control 30 to, for example, place the control in position "1", can be done to restart the drill 12 at the full power mode (i.e., mode "1"). The controller 28 can also be programmed to gradually reduce the applied voltage to the motor 10a to simulate power loss once the motor is pushed past a safe operating range while in one of its efficiency modes. A maximum current limit can be used if the drill 12 is being used in one of its efficiency modes.

The controller 28 could also be used to automatically switch the motor 10a out of one of its efficiency modes and into one of its power modes when the drill 12 is stalled in a particular gear, to produce a higher power output from the motor 10a. Preferably, time duration during which the drill 12 can be operated at the higher power mode is monitored and limited to prevent excessive heating of the motor 10a.

The controller 28 can also be used to implement one or more braking modes to reduce the stress on various internal components of the drill 12. For example, regenerative braking could be achieved by generating current from the motor 10a inertia and directing it back into the battery 22.

The controller 28 can also be used to implement a torque control feature for anti-lock, and thus to implement a form of "electronic" clutch. For example, sensing the instantaneous rate of change of the current being drawn by the motor 10a can be used to control the torque output of the motor. This can provide anti-kickback or anti-lock features to the drill 12. The maximum current that can be drawn by the motor 10a in a given operating mode can be limited, such as by software, if desired. The controller 28 can also be used to implement reversing capability for the motor 10a. Any suitable method of providing a forward/reverse signal to the windings 56, 58 and 60 can be used. Preferably, the maximum efficiency mode is the "default" mode when the tool 12 is switched to reverse. A different current limit value could be set for the motor 10a when the motor is being operated in reverse. For example, if a relatively high current limit is set when the drill 12 is being operated in the reverse mode, this would enable higher torque to be generated by the motor 10a, and thus enable faster removal of threaded screws from a workpiece.

Still further, the controller 28 could be configured using either a closed loop or open loop approach. If a closed loop approach is used, the controller 28 would use feedback from the current sensing system 40 and the motor speed sensor 38 to modify the operating characteristics of the motor 10a. If an open loop approach is used, the controller 28 may use one or more look-up tables with stored information (i.e., various motor speeds and/or current draws of the motor 10*a*) to select the optimum operating mode during a given work task. Moreover, the controller 28 could be integrated in a single assembly (i.e., "package") with the motor 10*a*, or located remotely from the motor 10*a* as illustrated in FIG. 1. The controller 28 could also be located on a common printed circuit assembly with the MOSFET power bridge 36 or remotely from the MOSFET power bridge. Still further, the MOSFET power bridge 36 could be located at a position rearwardly of the motor 10*a* (i.e., on the opposite end of the motor 10*a* in FIG. 3).

The motor system 10 thus enables a plurality of different operating modes to be achieved from a single motor. Modes ranging from a maximum efficiency mode to a maximum power mode can be implemented by user selection or automatically by the controller 28. Various intermediate levels of efficiency and/or torque output from the motor 10*a* can be achieved, again either through user selection or automatically via the controller 28. The system 10 enables the run time of a battery to be extended when the tool is being used in applications where a lesser amount of motor power is needed, and easily switched, either manually or automatically, to provide more motor power if the work task requires such.

Packaging of Motor

Referring to FIGS. 34-37, one embodiment for packaging of the motor 10*a* and making the electrical connections between the movable contact ring 50 and the connector block 48 will now be described. With FIGS. 34-37 it will be assumed that the motor 10*a* includes a pair of phase coils in each one of three phase windings. The phase windings may be connected in either a delta or a wye configuration. The contact ring 50 and connector block 48 enable the user to manually move the contact 50 between a first position where the phase coils are connected in series, and a second position where the phase coils are connected in parallel. For the following examples in which series and parallel connections of the coils will be discussed, it will be assumed that the phase windings are coupled in a wye configuration. However, a delta configuration could just as easily be used.

The connector block 48 is positioned in a recess 202 in an end 204 of a can 200. The motor 10*a* is supported within the can 200. The contact ring 50 is held adjacent the end wall 204 of the motor can 200 typically by an internal groove 206 formed in the housing or a plurality of internal, circumferentially spaced apart tabs projecting from an interior area of the tool housing. By either method, the contact ring 50 is able to move rotationally about its axial center.

Referring further to FIGS. 34, 35 and 36, the contact ring 50 includes a pin 208 projecting from a first surface 210. In FIG. 35, the pin 208 can be coupled to a manually slidably member 50*a* that a user can engage with a finger or thumb to move the contact ring 50 between its first and second positions. The contact ring 50 could also be coupled to a solenoid or other form of electromechanical device that engages the pin 208 and moves the contract ring 50 rotationally as needed to place it in position to effect a series connection or a parallel connection for the phase coils in each phase winding of the motor 10*a*.

Referring to FIG. 36, a surface 214 of the contact ring 50 includes a plurality of groups of jumper terminals 216*a*,216*b*, 218*a*,218*b* and 220*a*,220*b*. In this example three groups of jumper terminals are illustrated because the motor in this example is a three phase motor. The plurality of groups of jumper terminals will correspond to the number of phases employed in the motor 10*a*. Each pair of jumper terminals 216*a*,216*b*, 218*a*,218*b* and 220*a*,220*b* is positioned closely adjacent to one another and spaced apart circumferentially around the surface 214.

Referring to FIG. 37, the connector block 48 is comprised of three distinct connector blocks 48*a*, 48*b* and 48*c* spaced circumferentially around the end of the motor can 200. Again, three distinct connector blocks 48*a*,48*b*,48*c* are included because the motor in this example is a three phase motor. Each connector block 48*a*, 48*b* and 48*c* includes four contact pads. The contact pads are labeled 48*a*1-48*a*4, 48*b*1-48*b*4 and 48*c*1-48*c*4. Contact pads 48*a*1-48*a*4 are used to make the series or parallel connections for the coils of the first phase winding. Contact pads 48*b*1-48*b*4 are used to make the series or parallel connections for the coils of the second phase winding, and contacts 48*c*1-48*c*4 are used for connecting the coils of the third phase winding in series and parallel configurations.

Referring now to FIG. 38 and 39, the connections effected by the contact ring 50 and jumper terminals 216*a*,216*b* for configuring the coils of one phase winding in parallel are illustrated. In FIG. 38, the connection to the MOSFET power bridge 36 (shown in FIG. 2) is made at contact pad 48*a*4, which connects to one side of coil 222. The MOSFET power bridge 36 supplies a drive current to energize phase coils 222 and 224. The contact pad 48*a*3 is connected to one side of coil 224. Contact pad 48*a*2 is coupled to the other side of coil 222. Contact pad 48*a*1 is coupled to a neutral buss 226. The jumper terminals 216,216*b* are illustrated in dashed lines to indicate the positions they assume when the series or parallel connections are made.

In FIG. 38, when the phase coils 222 and 224 are to be connected in parallel, the movable contact ring 50 is positioned in its "Parallel" connection position, the jumper terminals 216*a*, 216*b* are in positioned in contact with the contact pads 48*a*1, 48*a*2, 48*a*3 and 48*a*4 as shown. In effect, contact pads 48*a*3 and 48*a*4 are electrically coupled, while contact pads 48*a*1 and 48*a*2 are electrically coupled. This couples one side of each of coils 222 and 224 together via jumper terminal 216*b*, and the other side of the coils together via jumper terminal 216*a*, which places the coils in parallel.

In FIG. 39, when the movable contact ring 50 is shifted rotationally to place the contact ring 50 in its "Series" connection position, jumper terminal 216*b* electrically couples contact pads 48*a*2 and 48*a*3, while jumper terminal 216*a* is electrically coupled to the neutral bus 226. This forms a complete series circuit with drive current being supplied through contact pad 48*a*4, through coil 222, through the contact pads 48*a*2,48*a*3 via the jumper terminal 216*b*, through coil 224, and through the neutral bus 226.

FIG. 39*a* illustrates how the phase windings of a three phase, brushless DC motor can be coupled to the connector blocks 48*a*, 48*b* and 48*c*. In this example each of the phase windings includes two phase coils. The phase A winding includes phase coils labeled "A1" and "A2". The phase B winding includes coils labeled "B1" and "B2", and the phase C winding includes coils labeled "C1" and "C2".

With further reference to FIG. 34, to help ensure adequate contact between the contact pads 48*a*1-48*a*4, 48*b*1-48*b*4, 48*c*1-48*c*4 and the jumper terminals 216,218,220, a conductive leaf spring 228 may be used to support each jumper terminal. For example, separate leaf springs 228 may be used to independently support jumper terminals 216*a* and 216*b*. Alternative biasing arrangements, for example using a single coil spring disposed coaxially with the output shaft 18 of the motor 10*a* in FIG. 34, could also be employed. The leaf springs 228 could also be formed from a non-conductive material, if the jumper terminals 216,218,220 each have their own conductor available for connecting to.

Referring now to FIG. 40, one arrangement for supporting the connector blocks 48a, 48b, 48c is illustrated. This arrangement makes use of terminal boards 230 to support the connector blocks 48a,48b,48c. Each terminal board 230 includes a planar portion 232 at least a pair of legs 234. The legs 234 may be pressed into a plastic insulator material of the stator 44 upon which the coils 222 and 224 of the phase windings are wound over. A rotor position sensor board 236 may be positioned at an opposite end of the stator 44. The ends of the various conductors that are used to form the phase coils may be routed close to the legs 234 of their terminal boards 230 and coupled as needed to the planar portion 232. Conductive traces on or within the planar portion 232 may be coupled to the contact pads of the respective connector block 48a,48b,48c.

Referring to FIGS. 41 and 42, another embodiment is illustrated that supports the contact ring 50 inside of the motor can 200. In FIG. 41, terminal boards 230' each include a portion 240 that supports the movable contact ring 50. The motor can 200 also includes an arcuate slot 242 (FIG. 42) that allows the pin 208 to project through the end wall 204 of the motor can 200. Additionally, it will be appreciated that the rotor position sensor board 236 shown in FIG. 40 could be formed on the planar portion 232' of each terminal board 230'.

Referring now to FIGS. 43-46, a system 300 is shown for dynamically controlling the switching of a dual wound, three phase brushless DC motor. By "dual wound" it will be appreciated that a bifilar winding is used to form a pair of coils 302,304 in each phase. In this example three phase windings are employed, although a greater or lesser number of phases could be implemented. Since the phase windings are of identical construction, only the first phase winding (Phase A) and its operation will be described. Referring to FIG. 43, a single pole, single throw (SPST) switch 306 is coupled across coil 304 and one of the pair of poles of a double pole, double throw (DPDT) switch 308. The DPDT switch 308 is coupled across coil 302. SPST switch 306 and DPDT switch 308 are unidirectional switches that each have "make before break" contact arrangements. A switch 310 is used to supply a drive current to the phase coils 302,304.

When switching from a parallel connection to a series connection, the switch 310 (FIG. 43), which may represent a MOSFET device, is turned off by the controller 28. This interrupts the flow of current through the phase coils 302,304. DPDT switch 308 then has its throw moved to the position where the pole is connected to contact 1. SPST switch 306 is left in the position shown in FIG. 46. At this point, DPDT switch 308 forms a conductive path between contacts 1 and 2 thereof. Since the current in each of the coils 302,304 cannot go to zero instantaneously, the switches 302,304 help to form freewheeling paths through which current may circulate through the coils 302,304. The switches are held in the above-described positions for a short time period, for example about 1-20 milliseconds, and more preferably about 1-2 milliseconds. The exact, preferred time parameter will depend on the precise construction of the motor 10a and the precise control scheme employed.

It is important to note the sequence of events and changing current levels when the switches 308 are closed to short across the motor 10a. The instantaneous current through the coil 304 will remain the same at the moment of contact, but will quickly decay due to two factors: 1) the inductive energy in the coil is dissipating; and 2) the spinning motor 10a generates a back EMF that will resist the current. This will cause the forward current to reach zero in a very short time, approximately 1-2 milliseconds depending on the inductive time constant of the motor 10a and the electromagnetic design. The second set of switches 306 must be opened at approximately the zero current crossing before the back EMF of the motor 10a generates a significant amount of reverse current across the short circuit. This unchecked reverse current would cause undesired braking of the motor 10a.

DPDT switch 308 is then controlled to break the connection with contact 1, and then SPST switch 306 is opened by the controller 28. This places the coils 203,304 in series as shown in FIG. 45. When switching from series to parallel, the switch 310 is again turned off by the controller 28. DPDT switch 308 is then moved so that it connects to contact 1 while still making a connection with contact 2. This configuration is maintained for a short time, for example 1-2 milliseconds until the current reaches zero, to form a freewheeling path for current to flow through coil 302. DPDT switch 308 then breaks the connection with contact 2 and SPST switch 306 is closed. This places coils 203,304 in a parallel configuration as shown in 44.

With a bifilar wound motor using the switching scheme described above, only half the switches are needed to run the motor 10a over that which are required in the previously described embodiments. Also, the voltage drop across each switch 306,308 is low because of the unidirectional nature of the switches. The switching system 300 is equally applicable to delta or wye connected phase coils. The switching system 300 can be easily implemented in a motor where switching between the series and parallel configurations is done manually by a user via a manually actuated switch on an housing of a power tool. This could also be used to enable the user to manually override automatic series/parallel switching in the event the user desires to maximize a specific operating characteristic of the motor (e.g., run time, maximum torque, etc.).

Referring now to FIG. 47, a switching system 400 is shown for coupling the windings 402, 404 and 406 of a three phase motor in either delta or wye configurations. Switches 408, 410 and 412 are each DPDT switches. To change from a delta to a wye configuration, the controller 28 is first turned off, thus interrupting the drive current to coil 402. The controller 28 then waits a short time interval (e.g., 1-20 milliseconds) before switching switches 402,404,406 to each connect with its number 1 contact. The controller 28 then again turns on the MOSFET (not shown) to apply current to the windings 402, 404,406. To switch from a wye to a delta configuration, this process is repeated, but with the switch contacts of switches 402,404,406 each being moved to break a connection with contact number 2 of each switch, and then make a connection with connection 1 of each switch. It will be appreciated that the dynamic switching scheme discussed above could also be applied to other forms of brushless motors, and is not limited to use only with a dual wound brushless motor.

Referring to FIG. 48, an example of a bidirectional switch 500 is shown that can be incorporated for use in the switching systems 300 and 400 described above. The bidirectional switch system 500 makes use of a plurality of diodes that effectively operate as single unidirectional switches to help control current flow to a desired direction. FIG. 49 illustrates diodes D1, D4, and a unidirectional switch 502 forming a series circuit to conduct current in one direction. FIG. 50 illustrates diodes D2, D3 and switch 502 forming a series circuit. The bidirectional switch system can also be formed by an electronically controlled triac.

It will be appreciated that the SPST and the DPDT switches discussed above could each be implemented using semiconductor switches and diodes, as well as mechanical switches. If the SPST and DPDT switches are semiconductor switches, then they could be controlled using a pulse width modulation (PWM) technique in order to achieve a smooth transition.

Advantages of a Dual Wound Brushless DC MOTOR

A dual wound brushless motor as described above provides significant advantages and flexibility in optimizing motor performance in power tool applications. Referring to FIG. 51, a graph 600 shows several performance curves that illustrate how the configuration of the windings of a dual wound, brushless DC motor (i.e., either series or parallel connected) can significantly alter the performance characteristics of the motor. Curve 602 depicts a motor performance designed for applications requiring lower torque and higher speed. To meet such a requirement, the coils of each phase winding of a dual wound, brushless DC motor may be coupled in parallel to produce a motor having a performance curve such as curve 604. Such a motor will run more efficiently and provide a longer run time at an operating point "A" on curve 602.

Curve 606 in FIG. 51 depicts a motor performance curve designed for applications requiring a higher torque and a lower motor operating speed. A dual wound, brushless DC motor can have its windings in each phase connected in series, to produce an operating curve 608. A motor configured to provide operating curve 608 will run more efficiently and provide longer run time on a given battery charge at a given load point "B" on curve 606.

Thus, the ability to configure the motor 10*a* in a dual wound configuration, and to connect the coils of each phase in either series or parallel (either statically or dynamically) provides improved productivity for a variety of work tasks by tailoring the motor performance characteristics to best match the work task being undertaken and/or to maximize run time. For example, point "A" on curve 602 may be more appropriate for a hammer drill application where high torque is not a requirement for the tool. However, the motor 10*a* would be able to operate at a high motor speed to provide the needed "beat frequency" that a hammerdrill requires. Conversely, point "B" on curve 604 may be an appropriate operating point for drilling applications where low speed and higher torque are needed. The following is a listing of desirable motor operating characteristics for various types of power tools with which a motor of the present disclosure, and particularly a dual wound brushless DC motor, is incorporated:

| Tool | Operating Characteristics |
|---|---|
| Drill | Fast speed-low torque for small diameter drill bits, and slow-speed, high torque for large diameter bits |
| Hammer Drill/Drill | Run fast in hammer-slower in drill |
| Miter/Table saw hybrid | High torque in table saw mode for rip cutting, higher speed in miter saw mode for better quality of cross cuts |
| Drill-driver/Impact Driver | High speed for impact-slow, high torque for drilling |
| Reciprocating Saw | Slow speed, high torque for cutting cast iron and steel; faster speed, lower torque for cutting wood |
| Metal/Wood Band Saw | Slow speed, higher torque for cutting metal; faster speed lower torque for cutting wood. Speed can be adjusted based on sensed blade tooth pitch and gullet load and/or speed particular geometry of the blade; phase coil connections can be set automatically by the controller 28. |
| Rotary Hammer | Faster speed for rotary; slower speed for drill |
| Stationary Grinder/Buffer | Slower speed for metal grinding; faster speed for buffing |

Rotor Construction

Referring to FIG. 52, a rotor 700 for use with the motor 10*a* is shown. The rotor 700 is positioned inside the stator 44 of the motor 10*a* and supported for rotational movement. The rotor 700 includes a back iron 702 having supported thereon a plurality of permanent magnets 704. A retaining sleeve 706 is used to hold the magnets 704 to the back iron 702. A shaft 708 extends through a central opening 710 in the back iron 702 and forms an output shaft of the rotor 700.

With reference to FIGS. 53 and 54, the construction of the rotor 700 is shown in greater detail. It is a principal advantage of the rotor 700 that the rotor makes use of qualities of both traditional surface permanent magnet mounted rotor construction and internally mounted permanent magnet rotor construction. The rotor 700 accomplishes this by the use of the arcuate shaped permanent magnets 704 that are positioned within pockets or recesses 712 formed in the back iron 702. The magnets 704 have an arcuate shape that matches the radius of curvature of the recesses 712, and an overall arc length that is just slightly smaller than the arcuate distance, represented by line 713 in FIG. 54. Projecting portions 714 help to define each of the recesses 712.

The back iron 702 also includes a plurality of bores 716 that serve to reduce the weight of the rotor 700. Bores 716 are also formed at areas of the back iron 702 where no magnetic flux is required to pass through. An additional plurality of oval or elongated shaped smaller bores 718 may be formed to extend through the bridge sections 714. Bores 718 help to reduce the flux leakage in the rotor 700 and the reluctance torque, thereby increasing power output. The bores 718 also provide the secondary benefit of further reducing the overall weight of the back iron 702, which improves power density. The bores 716 also provide the benefit of helping to direct the magnetic flux to increase air gap flux, and thus also enhance output power.

The back iron 702 could be formed as a laminated steel assembly with the bores 708, 716, 718 and the recesses 712, punched out of each lamination layer. Alternatively, the back iron could be formed from powdered metal, and the bores 716, 718, 708, and the recesses 712 formed in one or more subsequent machining operations. The retaining sleeve 706 could be formed through an overmolding process with a suitable, non-conductive material, such as plastic, so that it forms a layer of uniform thickness over the entire outer surface of the magnets 704 and the outermost surfaces of the bridge sections 714. Alternatively, the retaining sleeve 706 could be formed independently from a suitable non-conductive material, and then pressed over the assembly of the back iron 702 and the magnets 704 in a separate manufacturing step. The shaft 708 may be made from any suitable material, but preferably comprises stainless steel. The retaining sleeve 706 may vary in thickness, but in one preferred form is at least approximately 0.5 mm thick.

The bridge sections 714 may also vary in thickness, but in one preferred form are each approximately 0.5 mm in width. FIGS. 55 and 56 show alternative preferred embodiments of the rotor 800 and 900, respectively, in which the thicknesses of the bridge sections 714 are increased over that of the bridge sections 714 of rotor 700. Common components or features with rotor 700 are denoted by numbers increased by 100 over those used to describe the rotor 700. In FIG. 56, components in common with the rotor 700 are denoted with numbers increased by 200 over those used to describe rotor 700. Because of the increased widths of the bridge section, the permanent magnets will have smaller arc dimensions. Rotor 800 (FIG. 55) has permanent magnets 804 each having an arc of about 70°. Rotor 900 (FIG. 56) has permanent magnets 904 each having an arc of about 60°.

The thicker the bridge section, however, the greater the increase in magnetic leakage and the greater the reluctance torque. Thus, controlling the thickness of the bridge sections 714 can provide the designer with a means to optimize performance characteristics of the rotor 700.

FIGS. 57-59 illustrate three alternative embodiments of the rotor 700 in which no bores are used in the back iron 702. FIG. 57 illustrates a rotor 1000 that is otherwise identical with the rotor 700 with the exception that rotor 1000 does not include any bores in its back iron 1002. Features or components in common with rotor 700 are indicated with numbers increased by 300 over those used to describe rotor 700. The rotor 1000 still makes use of a plurality of arcuate permanent magnets 1004 disposed in recesses 1012 in the back iron 1002. In this example, bridge portions 1014 are formed to help define the recesses 1012, and enable magnets 1004 each having an 80° arc dimension to be employed, In FIG. 58, rotor 1100 has a back iron 1102 that includes permanent magnets 1104 positioned within recesses 1112. Bridge sections 1114 are thicker, and thus the magnets 1104 are each limited to a 70° arc dimension.

In FIG. 59, rotor 1200 has a back iron 1202 that includes permanent magnets 1204 positioned within recesses 1212. Bridge sections 1214 are even thicker, and limit each of the magnets 1204 to a 60° arc dimension.

While each of the rotor embodiments described herein illustrates a cylindrically shaped rotor, it will be appreciated that the outer diameter of any of the rotors 700, 800, 900, 1000, 1100 or 1200 could be shaped to optimize desired performance characteristics such as flux concentration, cogging torque reduction, torque ripple reduction and power output. The various embodiments of the rotor described herein all offer excellent permanent magnet retention that allows the rotor to be used in high speed motors and also helps to reduce eddy current losses in the rotor.

The description of the various embodiments, as provided herein, is merely exemplary in nature and, thus, variations that do not depart from the gist of the descriptions provided are intended to be within the scope thereof.

What is claimed is:

1. A power tool, comprising:
an electric motor having a plurality of windings, the electric motor being supported with a housing;
a switching system for selectively coupling said windings;
a transmission disposed within the tool housing and coupled to an output shaft of the motor, the transmission having an output and providing a plurality of selectable gear ratios; and
a controller for controlling said switching system to selectively connect said windings in a plurality of different configurations, and to selectively control said transmission, to enable a greater plurality of different operating speeds and different output power levels to be obtained at said output of said transmission than could be provided by controlling only a selection of said gear ratios of said transmission.

2. The power tool of claim 1, wherein the switching system comprises a movable member configured to make electrical connections with a plurality of electrical contacts, the electrical contacts being in communication with specific ones of said windings.

3. The power tool of claim 1, wherein each said winding comprises at least a pair of coils forming a phase of the electric motor.

4. The power tool of claim 3, wherein said switching system operates to connect predetermined pairs of said coils in parallel.

5. The power tool of claim 3, wherein said switching system operates to connect predetermined pairs of said coils in series.

6. The power tool of claim 1, further comprising a motor speed sensor for sensing a speed of said motor, the motor speed sensor providing an output to said controller.

7. The power tool of claim 1, further comprising a current sensor in communication with said controller for providing a signal indicative of a current flow through said windings of said motor.

8. A power tool, comprising:
an electric motor having a plurality of windings, the electric motor being supported within a housing of the tool;
a switching system for selectively coupling said windings in a plurality of different configurations; and
a controller responsive to a user command for selectively connecting said windings to provide either maximum efficiency or maximum power from said motor.

9. The power tool of claim 8, wherein said switching system comprises a movable ring having a plurality of electrical contacts for selectively coupling said windings.

10. The power tool of claim 9, wherein said switching system operates to connect said windings in a either a delta configuration or a wye configuration depending on a signal received from said controller.

11. The power tool of claim 8, wherein said windings are comprised of three phase windings, each of said phase windings including at least one coil.

12. The power tool of claim 11, wherein each of said windings are comprised of at least a pair of coils.

13. The power tool of claim 12, wherein said controller controls said switching system to selectively couple said coils of each said phase winding in either series or parallel configurations.

14. The power tool of claim 8, further comprising a transmission coupled to an output shaft of said motor, the transmission providing a plurality of stages of gear reduction in response to signals from said controller to further control an output component of said power tool.

15. The power tool of claim 14, wherein:
said windings comprise three phase windings; and
wherein said controller controls said transmission and said switching system to further tailor an output of said motor to meet a needed work task being performed with said power tool.

16. The power tool of claim 15, wherein said switching system operates to connect said phase windings in either a delta configuration or a wye configuration depending on signals received from said controller.

17. The power tool of claim 16, wherein at least one of said phase windings comprises at least a pair of coils, and wherein said switching system connects said coils in series or parallel configurations depending on signals received from said controller.

18. A power tool, comprising:
an electric motor having a plurality of windings;

a user controllable switching system for enabling a user to selectively coupling said windings in a plurality of different configurations to provide:
- a first tool operating mode that tailors an output of the electric motor to perform a first tool function relating to optimizing motor efficiency; and
- a second tool operating mode that tailors the output of the electric motor to perform a second tool function relating to optimizing motor power.

19. The power tool of claim 18, further comprising a controller responsive to a user command for controlling said switching system.

20. The power tool of claim 18, further comprising a manual control accessible by a user for controlling said switching system.

21. The power tool of claim 18, further comprising a transmission coupled to an output shaft of said motor, the transmission having a plurality of stages of gear reduction and being controlled by said controller to further tailor an output of said motor to provide a desired operating characteristic.

22. The power tool of claim 19, wherein said controller selectively connects said windings in a plurality of different configurations automatically in response to a sensed operating condition.

23. The power tool of claim 19, wherein said controller controls said switching system to couple said windings in a delta configuration.

24. The power tool of claim 19, wherein said controller controls said switching system to couple said windings in a wye configuration.

25. A power tool, comprising:
- an electric motor having a plurality of windings, the electric motor being supported within a housing of the tool;
- a switching system for selectively coupling said windings in a plurality of different configurations;
- a transmission having an input and an output, said input being coupled to an output shaft of said electric motor, and
- a controller for selectively connecting said windings and selectively controlling said transmission to provide a plurality of different operating characteristics ranging from a high efficiency mode to a high power mode in accordance with the needs of a work task being performed with the tool.

26. A power tool, comprising:
- an electric motor having a plurality of windings, the electric motor being supported within a housing of the tool;
- a switching system for selectively coupling said windings in a plurality of different configurations; and
- a controller responsive to a user command for selectively connecting said windings to selectively maximize at least one of motor speed, motor efficiency, and motor power.

27. A power tool, comprising:
- an electric motor having a plurality of phase windings, each said phase winding including a plurality of coils;
- a switching system for selectively coupling said coils in series to configure said electric motor for a first operating mode when said power tool is to be used to perform a first function, and to couple said coils in parallel to configure said electric motor in a second operating mode when said power tool is to be used to perform a second function; and
- a controller responsive to a user command for selectively connecting said coils in said series and parallel configurations.

28. The power tool of claim 27, wherein said electric motor comprises a brushless motor.

29. The power tool of claim 27, wherein said power tool comprises a hammerdrill, wherein said first function comprises a hammer function of said hammerdrill, and wherein said second function comprises a screwdriver mode of said hammerdrill.

30. The power tool of claim 27, wherein said power tool comprises a saw, wherein said first function comprises performing a cross cut with said saw, and wherein said second function comprises performing a rip cut with said saw.

* * * * *

UNITED STATES PATENT AND TRADEMARK OFFICE
CERTIFICATE OF CORRECTION

| | | |
|---|---|---|
| PATENT NO. | : 7,602,137 B2 | Page 1 of 1 |
| APPLICATION NO. | : 11/676482 | |
| DATED | : October 13, 2009 | |
| INVENTOR(S) | : Hung T. Du et al. | |

It is certified that error appears in the above-identified patent and that said Letters Patent is hereby corrected as shown below:

Column 21,
Line 54, "with" should be -- within --.

Column 23,
Line 2, "coupling" should be -- couple --.

Signed and Sealed this

Nineteenth Day of January, 2010

David J. Kappos
*Director of the United States Patent and Trademark Office*